United States Patent [19]

Payne et al.

[11] 4,233,498
[45] Nov. 11, 1980

[54] POWER CONTROL FOR APPLIANCE USING HIGH INRUSH CURRENT ELEMENT

[75] Inventors: Thomas R. Payne, Louisville, Ky.; Alfred L. Baker, Longmount, Colo.

[73] Assignee: General Electric Company, Louisville, Ky.

[21] Appl. No.: 8,356

[22] Filed: Feb. 1, 1979

[51] Int. Cl.³ .......................... H05B 1/02; H05B 3/68
[52] U.S. Cl. .................................. 219/490; 219/492; 219/486; 219/506; 219/464; 219/483; 307/38; 307/41; 340/711; 323/25
[58] Field of Search ............... 219/483, 506, 485, 508, 219/486, 464, 490, 492, 494, 497, 501, 10.55 B; 307/38, 39, 40, 41, 252 UA; 323/18, 24, 22; 340/337; 363/37

[56] References Cited

U.S. PATENT DOCUMENTS

| | | | |
|---|---|---|---|
| 3,541,429 | 1/1970 | Martin | 219/492 |
| 3,878,358 | 4/1975 | Barton et al. | 219/497 |
| 3,912,905 | 10/1975 | Giler | 219/464 |
| 3,974,472 | 8/1976 | Gould, Jr. | 219/506 |
| 4,010,412 | 3/1977 | Forman | 307/41 |
| 4,046,991 | 9/1977 | Sefton et al. | 219/497 |
| 4,078,168 | 3/1978 | Kelly | 219/497 |
| 4,086,466 | 4/1978 | Scharlack | 219/501 |
| 4,104,715 | 8/1978 | Lawson, Jr. | 363/37 |
| 4,135,122 | 1/1979 | Holmquist et al. | 219/492 |

OTHER PUBLICATIONS

Inspec–"Single Chip Microprocessor Rules the Roast", Electronics vol. 49, No. 25, pp. 105–110, 12/9/76.

*Primary Examiner*—Thomas J. Kozma
*Assistant Examiner*—M. Paschall
*Attorney, Agent, or Firm*—Bernard J. Lacomis; Radford M. Reams

[57] ABSTRACT

A power control method and system for a cooking appliance using a high inrush current element in which the instantaneous glow from the heater element is utilized to inform the operator of appliance turn-on. The power control includes a logic arrangement for detecting the transition of the appliance from an OFF condition to a selected one of a plurality of power level settings. Prior to energizing the heating element at the selected power level, the control energizes the element for a preselected transient time at a level to produce a visible glow.

27 Claims, 28 Drawing Figures

POWER UP

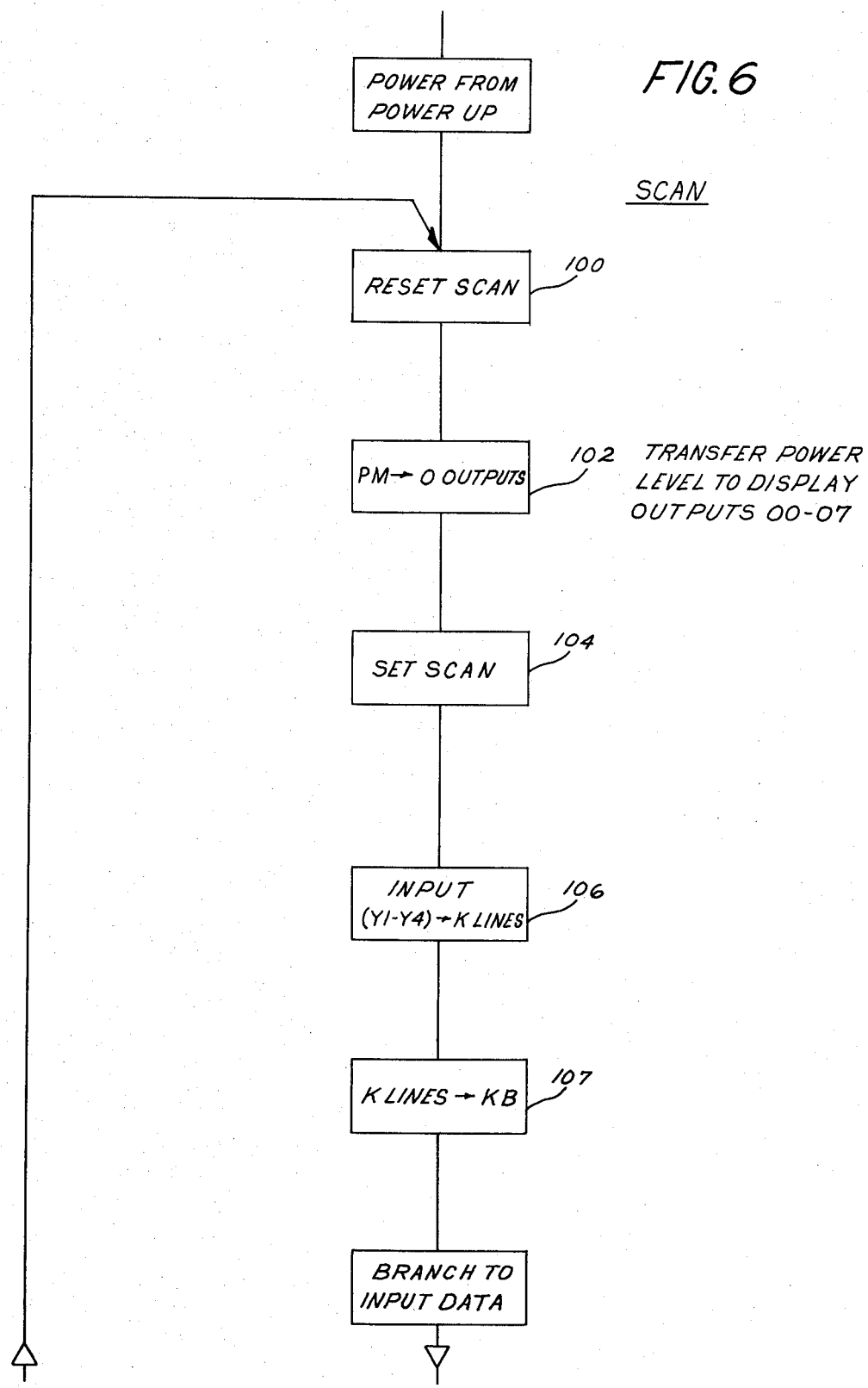

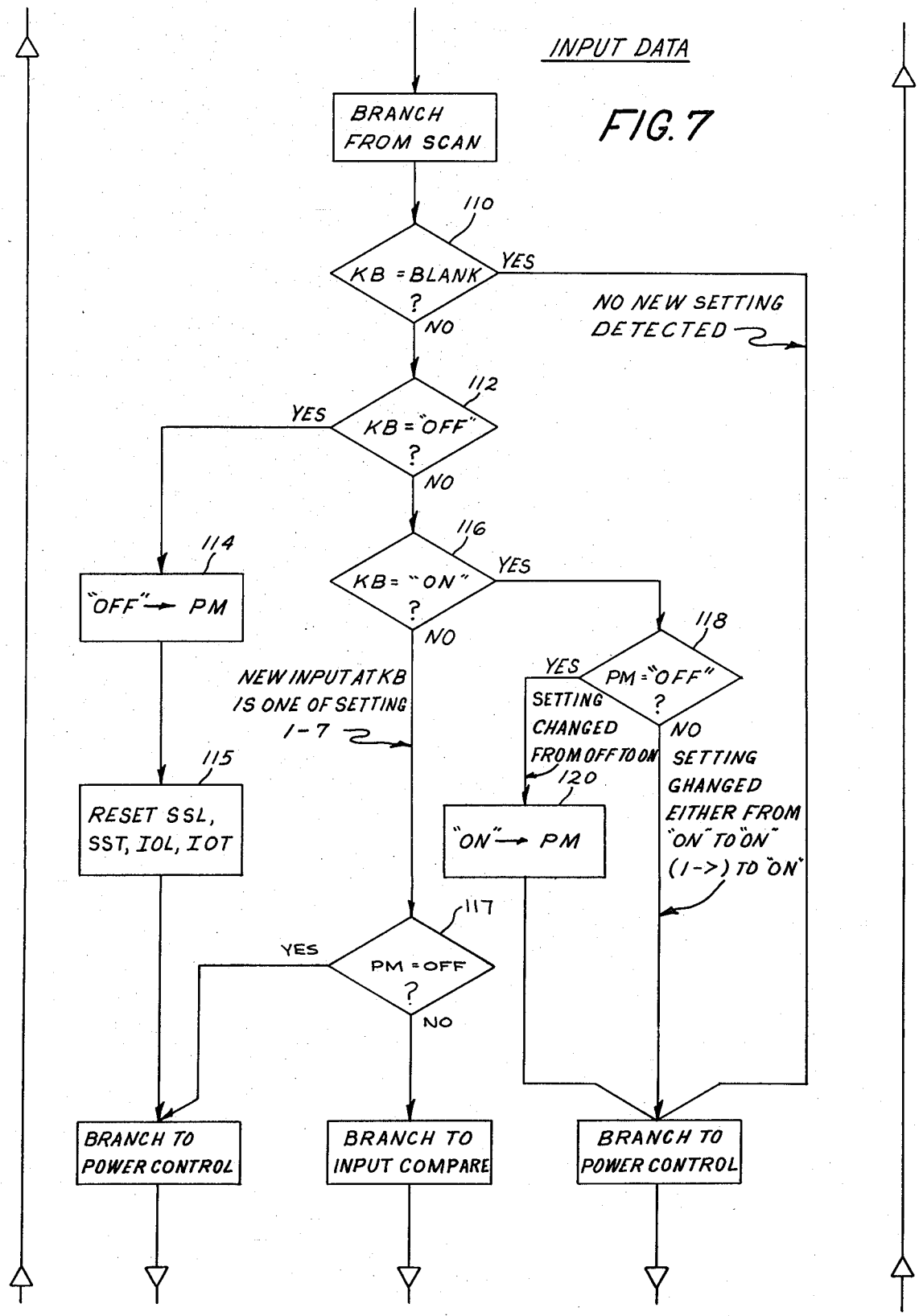

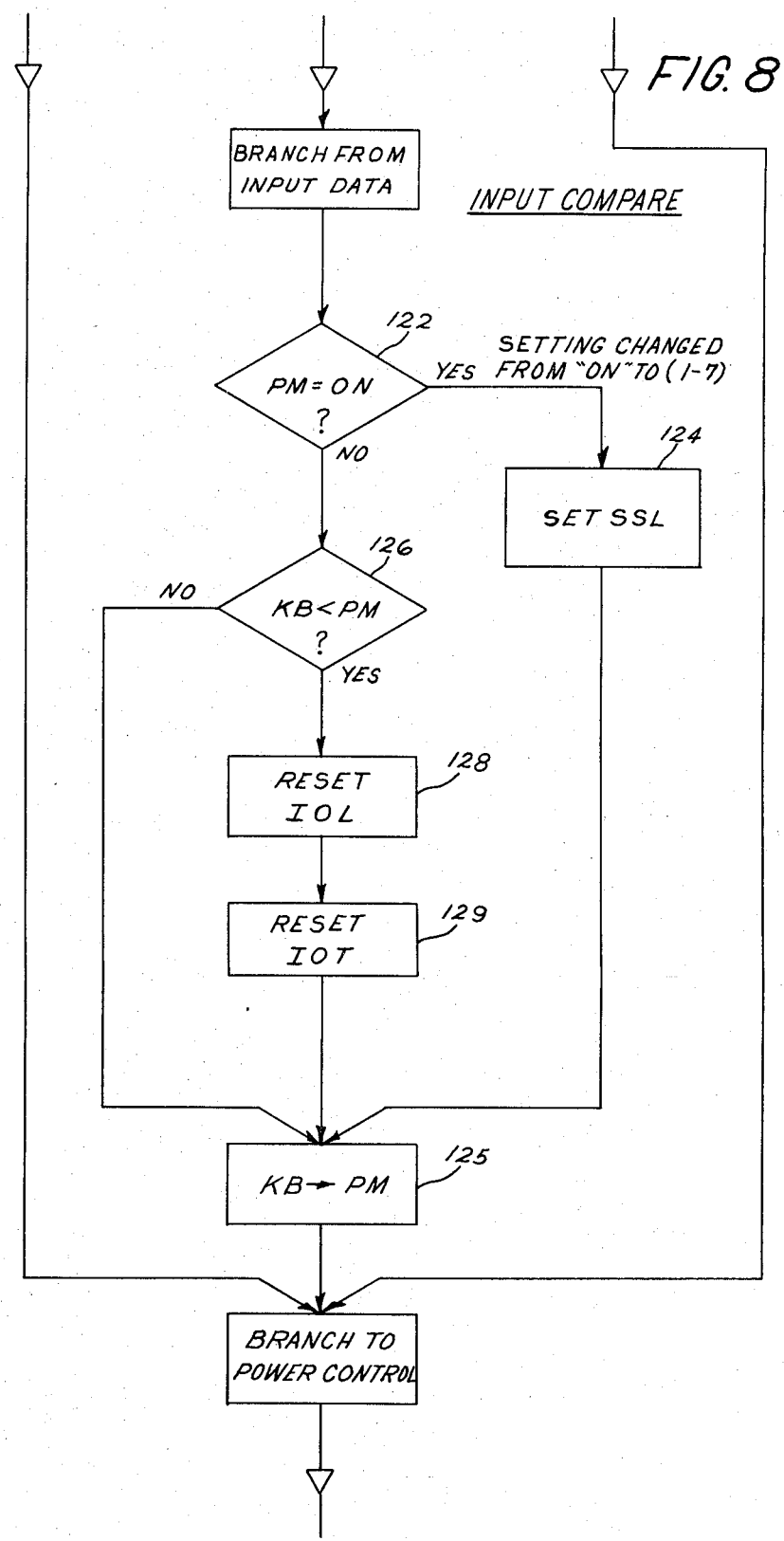

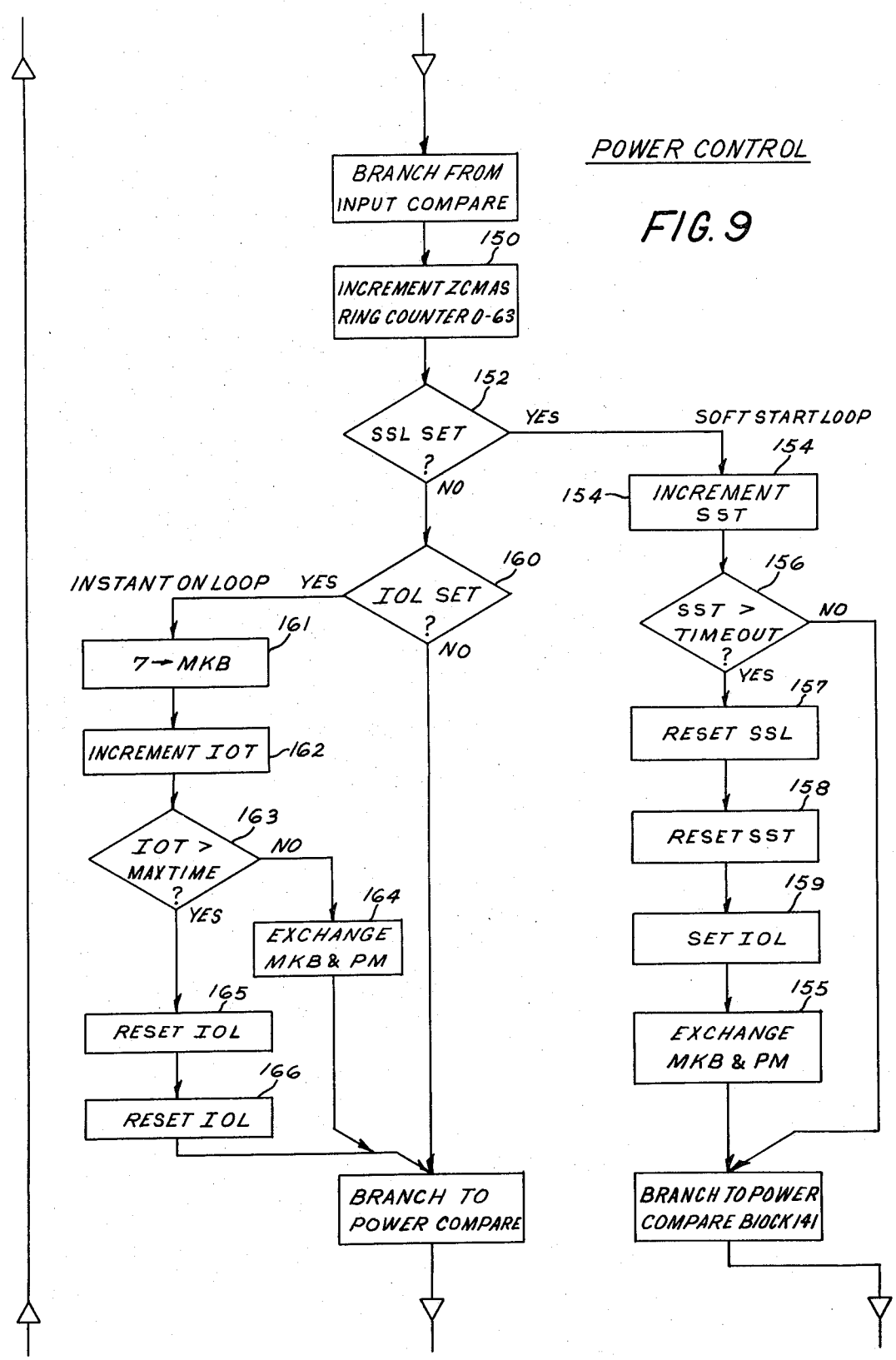
FIG. 9 POWER CONTROL

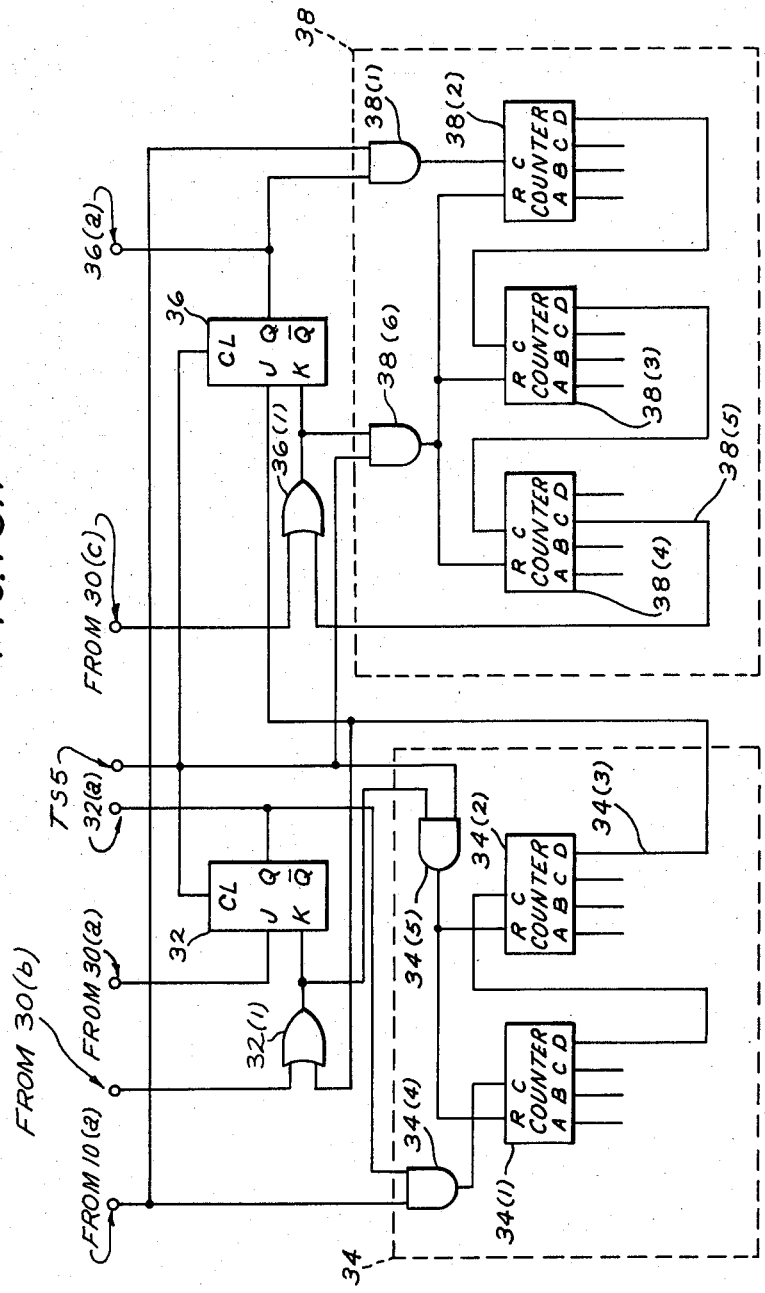

POWER CONTROL FOR APPLIANCE USING HIGH INRUSH CURRENT ELEMENT

CROSS REFERENCES TO RELATED APPLICATIONS

This application is related to the following commonly assigned, copending applications: Ser. No. 008,376, "Power Control for Appliance Using High Inrush Current Element," filed in the name of Thomas R. Payne; Ser. No. 008,376, "Power Control for Appliance Using Multiple High Inrush Current Elements," filed in the names of Thomas R. Payne and Alfred L. Baker; and Ser. No. 008,376, "Repetition Rate Power Control for Appliance Using High Current Inrush Elements," filed in the names of Thomas R. Payne and Alfred L. Baker.

The disclosures of the above-noted related applications are hereby incorporated by reference.

BACKGROUND OF THE INVENTION

Use of glass ceramic plates as cooktops in electric cooking apparatus is becoming increasingly common. Among the advantages of this smooth cooking surface is its pleasing appearance and easy cleanability. However, due to the high thermal impedance of the glass ceramic plate, such cooktops are less efficient thermally than conventional cooking surfaces using sheathed heating elements.

Due to unique electrical and thermal characteristics possessed by materials such as molybdenum disilicide ($MoSi_2$) and tungsten, resistive heating elements made from these materials are attractive for use with glass ceramic cooktops. The high positive temperature coefficient of resistivity, low thermal mass, and low specific heat characteristic of $MoSi_2$ and tungsten and the high operating temperature achievable using heating elements made from these materials provide the potential for improved thermal efficiency for cooking apparatus which incorporate a glass ceramic cooktop. However, these same dynamic electrical and thermal characteristics create power control problems which have thus far rendered the use of heating elements made from these materials impractical in electric cooking apparatus.

Conventionally, power control in electric cooking apparatus is achieved using temperature sensitive switches, such as bimetalic infinite heat switches. In operation, the operator adjusts the switch to provide the desired cooking temperature. The switch remains closed until the heating element reaches a predetermined temperature. The switch then opens and remains open until the element temperature drops to a predetermined temperature. The switch continues to cycle ON and OFF in this manner indefinitely. Since conventional sheathed heating elements heat up and cool down relatively slowly, these switching cycles are relatively long, ranging from a few seconds to thirty seconds. In addition, the resistance of a conventional sheathed heating element changes only slightly in going from room temperature to operating temperature. Since the resistance of conventional heating elements is relatively independent of temperature in the temperature range of interest, transient current surges when the switches close are minimal. Thus, conventional power control techniques work satisfactorily.

However, the dynamic characteristics of resistive heating elements made from $MoSi_2$ or tungsten prevent these heating elements from being controlled using conventional control techniques. Firstly, a $MoSi_2$ heating element, as described generally in U.S. Pat. No. 3,912,905, designed for use in a cooking appliance, typically varies in resistance from 2-3 ohms at room temperature to 25 ohms at an operating temperature of approximately 1000° C. Thus, assuming energization from a standard 240 volt AC household supply, as the temperature of the heating element changes from room temperature to operating temperature, the load current changes from an initial peak of roughly 110 amps to a steady state current on the order of 8.5 amps RMS. This initial current of 110 amps is obviously greater than can be tolerated in a household appliance except for extremely brief periods. Secondly, the heating element cools extremely rapidly; the first time constant for thermal response of this heating element being in the 600-1000 millisecond range. Since the element ment cools rapidly with a concurrent drop in resistance, excessive current surges may occur even during steady state operation because the resistance of the element may drop between applications of power to a level which draws excessive current during each subsequent application of power. Therefore, a very rapid switching capability which enables the use of brief ON times to limit the duration of excessive current during the heat-up of the element and brief OFF times to prevent unacceptable drops in resistance during steady state operation by limiting cooling of the element between ON times is required to avoid frequent excessive current surges.

Clearly, the relatively slow mechanical switching of the conventionally employed infinite heat switches cannot provide the rapid switching required to prevent excessive current flow during each application of power. Similarly, conventional electronic controls for use with conventional heating elements in cooking appliances have been designed to employ relatively long ON and OFF periods.

This problem was addressed in concurrently filed, commonly-assigned application Ser. No. 008,376, filed in the name of Thomas R. Payne, entitled "Power Control For Appliances Using High Inrush Current Element," which disclosure is hereby incorporated by reference. This application discloses a control system for use with a high inrush type heating element (molybdenum disilicide, tungsten, etc.) which overcomes the excessive current draw of these elements during initial heat-up period by using a so-called Soft Start routine during which current is limited for a predetermined time by a rapid coupling and decoupling of the element to the power supply. This transient heat-up period is followed by a Steady State power control period during which power is switched in a manner to effect the production of a selected heat or power output from the element.

Heating elements made of $MoSi_2$ or tungsten glow almost instantaneously when energized. However, the glass ceramic cooking surface attenuates the visible glow at the lower power settings. It is desirable to advantageously use the rapid color glow capability of $MoSi_2$ and tungsten type heating elements to provide immediate visual feedback to the operator that the heating element has been activated, regardless of the power setting selected.

OBJECTS OF THE INVENTION

Accordingly, a principal object of the invention is the provision of a power control system for use with resistance heating elements which draw relatively high current (above normal household maximums) upon the application of power at room temperatures.

A further object of the present invention is the provision of a power control system for use with resistive heating elements made of MoSi$_2$, tungsten, or similar materials which electronically controls power in a manner which prevents recurring excessive current surges during steady state operation.

A further object is the provision of a power control system for an electric cooking device having one or more heating elements of the above-noted type which responds to operator changes from an OFF power setting to any one of several power settings by controlling power to the heating element over a first preselected time in accordance with a transient Soft Start control routine which is independent of the power setting selected to prevent initial current overloads and which reverts to a Steady State routine after a first predetermined time has elapsed.

A further object is the provision of power control system for an electric cooking device having one or more heating elements of the above-noted type which further responds to power setting changes from an OFF power setting to one of several power settings by controlling power to the heating element over a second preselected time, commencing immediately following the expiration of the above-mentioned first preselected time, in accordance with a transient Instant On control routine which independently of the power setting actually selected drives the heating element at a power level which is sufficiently high to cause the heating element to glow with sufficient intensity to be readily visually perceivable by an operator through the glass ceramic cooking surface, and which reverts to a Steady State routine after maintaining the glow for a period of predetermined duration.

A further object is the provision of power control for an electric range of the type mentioned above in which the Instant On period of operation is automatically terminated when the power setting is changed to a lower power setting when the instant operating period is in progress.

SUMMARY OF THE INVENTION

These objects are accomplished in the present invention by providing an electronic power control system in which the output power of one or more heating elements for an electric cooking appliance, such as an electric hotplate, is electronically controlled to provide a cooking temperature which corresponds to a power setting selected by an operator from a plurality of discrete power level settings. Preferably, the heating element itself is characterized by rapid thermal and electrical response typical of heating elements made from MoSi$_2$ or tungsten, and is used in conjunction with a glass ceramic or other imilar cooking support surfaces. The heating element is energized by power pulses comprising half-cycles of the AC power signal. Electronic switching is employed to control the power pulse repetition rate. A digital control signal representing the power setting selected is stored in a memory. During steady state operation, the particular power pulse repetition rate is determined by the response of the control logic to this stored control signal. In addition to a steady state operating mode, two additional operating modes designated Soft Start and Instant On are provided by this invention.

The Soft Start mode is initiated whenever the power setting is changed from an OFF power setting to any other power setting. When operating in the Soft Start mode the power pulse repetition rate is controlled independently of the actual power setting selected and stored in memory by substituting a predetermined power pulse repetition rate for the pulse repetition rate associated with the actual power setting. This Soft Start pulse repetition rate enables a relatively high, but not excessively high, current to be applied to the cold heating element without exceeding the current-carrying capacity of the power circuit as the resistance of the heating element changes from its relatively low value at room temperature to its relatively high value at operating temperature. After a predetermined time has elapsed, the control system terminates the Soft Start operating mode and initiates the Instant On operating mode.

An Instant On operating mode is provided to give a nearly immediate visual indication to the operator in the form of a glowing heating element that the heating element has been switched from OFF to some other power setting. In the Instant On mode, the repetition rate associated with the maximum power setting (or some other suitably high setting) is substituted for the actual power setting for a predetermined period causing the heating element to glow brightly immediately following the termination of the Soft Start mode. Choice of duration for this operating mode is limited by the thermal response rate of the glass ceramic surface. The Instant On mode is terminated before the temperature of the cooking surface significantly exceeds the lowest possible cooking temperatures to avoid overcooking when the lowest power setting is selected. After a predetermined time has elapsed for the Instant On mode, the control system terminates the Instant On mode and reverts to the actual power setting selected, thereby initiating Steady State operation. Provision is also made to prematurely terminate the Instant On operating mode when, during this mode, the power setting is changed to a lower power setting.

In the preferred embodiment of this invention, a custom programmed microprocessor provides the control logic. However, an alternate embodiment is disclosed in which the control logic is implemented using discrete digital logic circuitry.

BRIEF DESCRIPTION OF THE DRAWINGS

FIGS. 5–11 are flow diagrams of the Power Up, Scan, Input Data, Input Compare, Power Control, Power Compare, and Power Out Routines, respectively, for the invention.

FIGS. 18A and 18B are logic diagrams showing in greater detail the Soft Start Latch, Soft Start Timer, Instant On Latch and Instant On Timer and Power On Latch, respectively, of FIG. 3 for the digital logic embodiment of the invention.

DESCRIPTION OF THE INVENTION

Overview

Figure 1:
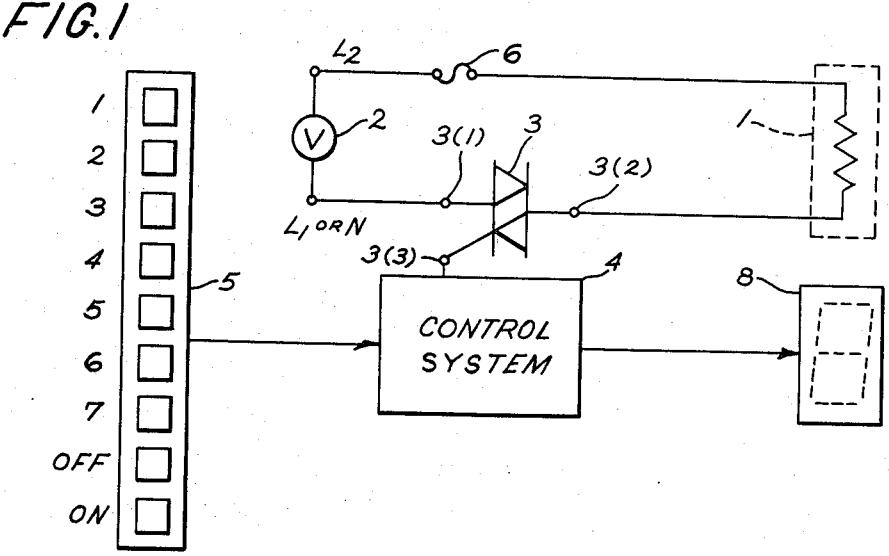
FIG. 1 is a generalized block diagram of a cooking arrangement employing the invention.

This invention, broadly speaking, is directed to controlling the output power of a resistive heating element. More specifically, it is directed to a control system for controlling the cooking temperature of a glass ceramic cooktop or hotplate employing a resistive heating element made of molybdenum disilicide ($MoSi_2$), tungsten or other material possessing similar dynamic thermal and electrical properties utilizing open loop control of the power output of the heating element.

According to this invention, cooking temperature is controlled by controlling the pulse repetition rate of power pulses applied to the heating element in accordance with a power setting selected by an operator from a plurality of discrete power settings. A range of discrete power settings covering a useful range of cooking temperatures is provided, each setting having uniquely associated with it a particular power pulse repetition rate and therefore a particular heat output.

The control system of this invention implements three operating modes, a Steady State mode, a Soft Start mode, and an Instant On mode. The Soft Start mode is employed when initially energizing a heating element which is at or near room temperature to avoid transiently overloading the current carrying capability of the heating element power circuit. As previously mentioned, the resistance of a heating element made of $MoSi_2$ or tungsten is roughly a factor of ten lower at room temperature than at operating temperature, being approximately 2.5 ohms at room temperatures and approximately 25 ohms at operating temperatures. Thus, to avoid an initial inrush current overload, a predetermined power pulse repetition rate is implemented independent of the actual power setting when operating in this mode. As is well known to those skilled in the art, relatively high peak currents of very short duration can be tolerated without blowing fuses, damaging circuit components or burning wires. Thus, the current overload problem is overcome by limiting the duration of the pulses and by adequately time spacing the pulses. However, it is also desirable to bring the heating element to operating temperatures rapidly to minimize the duration of this period of relatively low heating element resistance and the resulting high current peaks. Close time spacing of the power pulses brings the heating element to operating temperature more quickly. Accordingly, a pulse repetition rate which provides an optimum compromise between these competing considerations is employed. A Soft Start pulse repetition rate which provides a satisfactory compromise has been determined empirically and will be described in greater detail hereinafter.

As is apparent from the foregoing discussion, it is desirable to implement the Soft Start mode whenever a cool (room temperature) heating element is to be energized. Since the use of temperature sensors would unnecessarily complicate the system, some alternate manner of identifying a cool heating element is needed. It will be recalled that heating elements of $MoSi_2$ or tungsten heat and cool very rapidly. As a practical matter, when an OFF power setting is selected by a human operator, the heating element cools so rapidly that it will cool down to room temperature (the heating element—not the glass cooktop) before the human operator can physically select another setting. Thus, the presence of an OFF power setting provides a satisfactory indication that the heating element is at room temperature. Accordingly, the Soft Start mode is implemented whenever the control system of this invention detects a change in power setting from an OFF setting to any other power setting.

The Instant On mode is employed to make advantageous use of the fact that heating elements made of $MoSi_2$ or tungsten, when energized at full power, glow brightly nearly instantaneously. In the Instant On mode, the maximum power pulse repetition rate is temporarily substituted for the pulse repetition rate corresponding to the actual power setting to cause the heating element to glow with sufficient intensity to provide glow which is visually perceivable to an operator through the cooking surface. This mode is implemented immediately following the Soft Start mode to provide the operator with a visual indication that the heating element has been turned on. Although the heating element itself glows visibly at even the lowest power setting employed in this system, the optical properties of the glass ceramic cooking surface conventionally used serves to filter or attenuate the visible radiation at the lower power settings to the extent that at the lower settings the glow is not readily perceivable to the operator through the cooking surface.

In practice the duration of the Soft Start mode is so short that the delay between the selection of a power setting by the operator and the appearance of the glow is barely noticeable. To the operator the heating element appears to glow almost immediately following a change in power setting from OFF to some other power setting. After a predetermined period of somewhat arbitrary duration (approximately 8½ seconds has been employed satisfactorily), this mode is automatically terminated, the duration being subject only to the obvious limitation that prolonged application of full power to the heating element may raise the temperature of the relatively slow responding glass ceramic cooking surface to a temperature which exceeds the temperature corresponding to the power setting selected by the operator.

Provision is also made to immediately terminate the Instant On operating mode in the event the power setting is changed by the operator to a lower setting prior to the expiration of the time allocated for this operating mode.

The Steady State mode, as the name implies, follows these initial transient modes. During Steady State operation, the repetition rate associated with the actual power setting selected by the operator is implemented.

The system operates in this Steady State mode at all times except during the brief period following a change in power setting from OFF to some other power setting. A change in power setting from one non-OFF setting to another non-OFF setting results in a change to the repetition rate corresponding to the newly selected power setting, with no temporary substitution for this repetition rate being implemented.

In the description which follows, frequent reference will be made to the drawings wherein identical reference numerals denote similar or corresponding elements throughout.

FIG. 1 illustrates generally the system to be controlled in accordance with the present invention. A resistive heating element 1, preferably constructed of $MoSi_2$ or tungsten, is coupled to standard 240 V, 60 Hz AC power source 2, through a triac 3 and a current limiting circuit breaker 6. Triac 3 is a conventional thyristor, capable of conducting current in either direction irrespective of the voltage polarity across the main terminals 3(1) and 3(2), when triggered by either a positive or a negative voltage applied to its gate terminal 3(3). Circuit breaker 6 is of the type conventionally employed to protect the wiring from excessive current. Breaker 6, as is typical of such devices, will open the circuit when the current exceeds the rated value over a finite period of time, but will not respond to current pulses of excessively high peak values but of very short duration and spaced sufficiently in time to limit the current to less than that required to trigger the circuit breaker. Control system 4 controls the power applied to heating element 1, by controlling the rate at which gate pulses are applied to gate 3(3) in accordance with power setting selections entered by an operator via keyboard 5.

In the embodiments hereinafter described as examples illustrative of the inventive concept, the power pulses applied to the heating element are half-cycles of the 240 V, 60 Hz AC power signal. However, power signals of different frequencies and voltage levels can be similarly used.

TABLE I

| Power Setting | Power Pulse Repetition Rate | Output Power % | Control Signal Code |
|---|---|---|---|
| (n = 6) | 1/64 | 5 | 0001 |
| 2 (n = 5) | 1/32 | 9 | 0010 |
| 3 (n = 4) | 1/16 | 15 | 0011 |
| 4 (n = 3) | 1/8 | 24 | 0100 |
| 5 (n = 2) | 1/4 | 37 | 0101 |
| 6 (n = 1) | 1/2 | 62 | 0110 |
| 7 (n = ) | 1/1 | 100 | 0111 |
| OFF | — | — | 1000 |
| ON | — | — | 1001 |

As indicated previously, a plurality of discrete power settings are provided each having uniquely associated with it a particular power pulse repetition rate. In a preferred embodiment, nine power settings including OFF and ON power settings are provided. Table I shows the pusle repetition rate and heating element output power, expressed as a percentage of total power, associated with each power setting.

Figure 2:
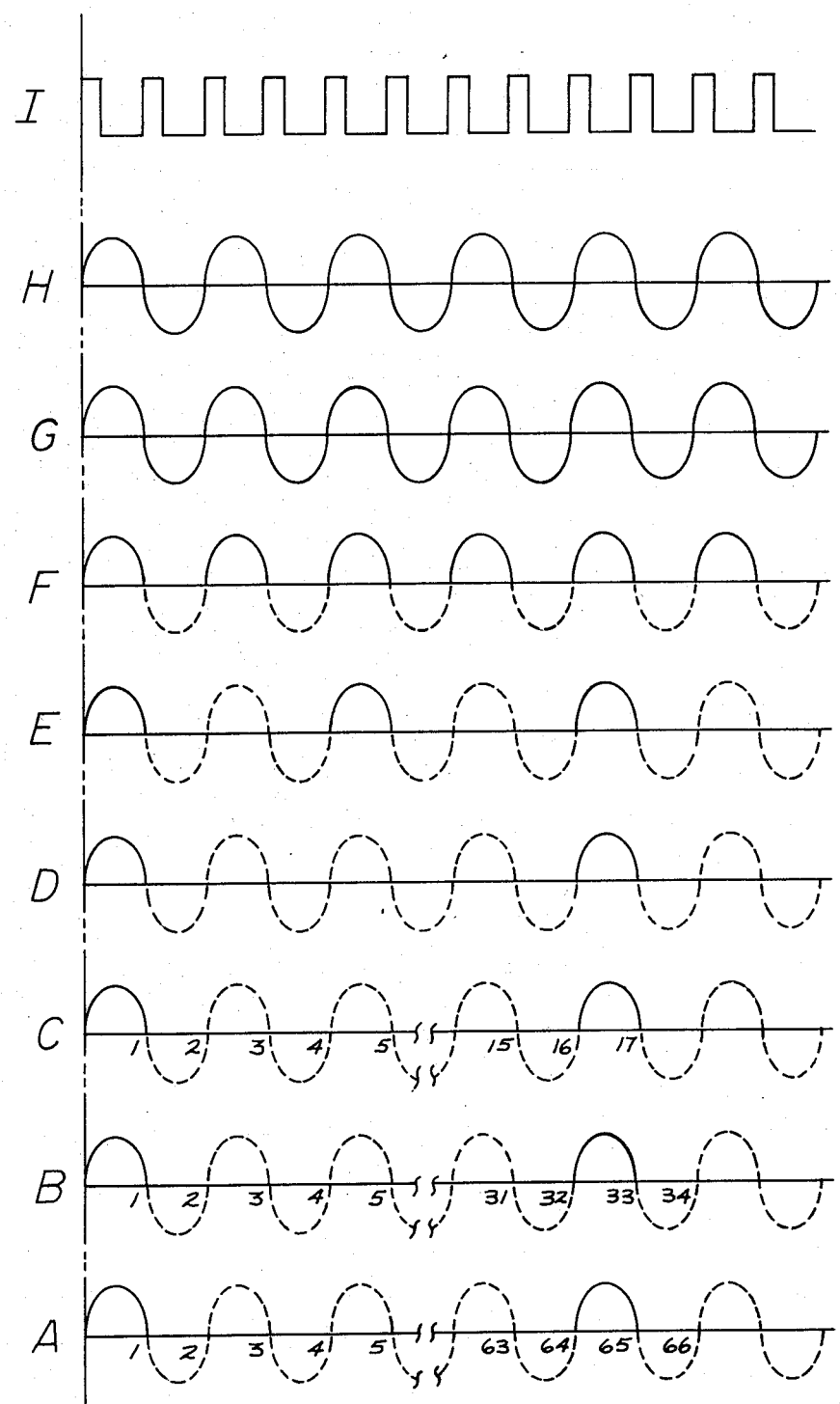
FIGS. 2A–2H illustrate power signals corresponding to various operator selectable power settings.

In FIG. 2, the waveforms A-G represent the voltage applied to heating element 1 for each of power settings 1-7, respectively. Waveform H represents the voltage at the power source. Those half-cycles of the power signal for which the triac is conductive, hereinafter referred to as power pulses, are represented by full lines; those half-cycles of the power signal during which the triac is non-conductive are shown in phantom. Waveform I of FIG. 2 represents zero cross over pulses, the time between consecutive zero cross over pulses being called a control interval.

It is apparent from FIG. 2 that the time between each power pulse is minimized for each power setting by virtue of the fact that equal OFF time is provided between each pulse. This differs from the duty cycle control approach disclosed in the above-noted co-pending application in which the control period is fixed and the desired percentage of ON time is achieved by applying an appropriate number of successive power pulses followed by an appropriate number of OFF pulses, the ratio of successive Power On pulses to the number of pulses in the control period being the duty cycle.

As mentioned previously, when employing duty cycle control, as the duration of the control period increases, the OFF times at the low duty cycles become long enough to allow the element to cool to the point that the resulting low resistance draws sufficient excessive current to threaten the reliability of the circuit components. Repetition rate control provides approximately the same output power levels while minimizing the steady state current surges by equally distributing the OFF time between each power pulse. In this fashion, the maximum OFF time between any two power pulses is minimized. Consequently, the cooling of the heating element and the resultant drop in element resistance between pulses is minimized, the ultimate effect being that the steady state surge currents are minimized at every power setting. Thus, employment of pulse repetition rate control reduces the steady state current surges relative to that which would occur using duty cycle control at comparable output power levels, except at the maximum (100%) and minimum power settings at which the duty cycle and repetition rates are the same.

As shown in TABLE I and FIG. 2, the pulse repetition rates vary from a pulse repetition rate of 1/64, that is one power pulse per 64 power signal half-cycles for power setting one, the lowest non-OFF power setting, to a rate of 1/1, one power pulse every half-cycle for setting seven, the maximum power setting. As an example, selection of power setting 3 results in voltage signal C of FIG. 2 corresponding to a repetition rate of 1/16 being applied to heating element 1.

In implementing the various repetition rate, control system 4 makes a decision during each power signal half-cycle or control interval, whether or not to apply a power pulse to the heating element during the next control interval. A decision to apply a power pulse is carried out in the next control interval by applying a trigger pulse to gate 3(3) of triac 3, at the beginning of that interval. When the decision is not to apply a power pulse during the next control interval, triac 3 is not triggered and thus is non-conductive during that control interval.

Switching of triac 3 is synchronized with the zero crossings of the power signal, as is common practice, to enchance triac reliability and to minimize electromagnetic interference resulting from switching transients.

Functional Description

Figure 3:
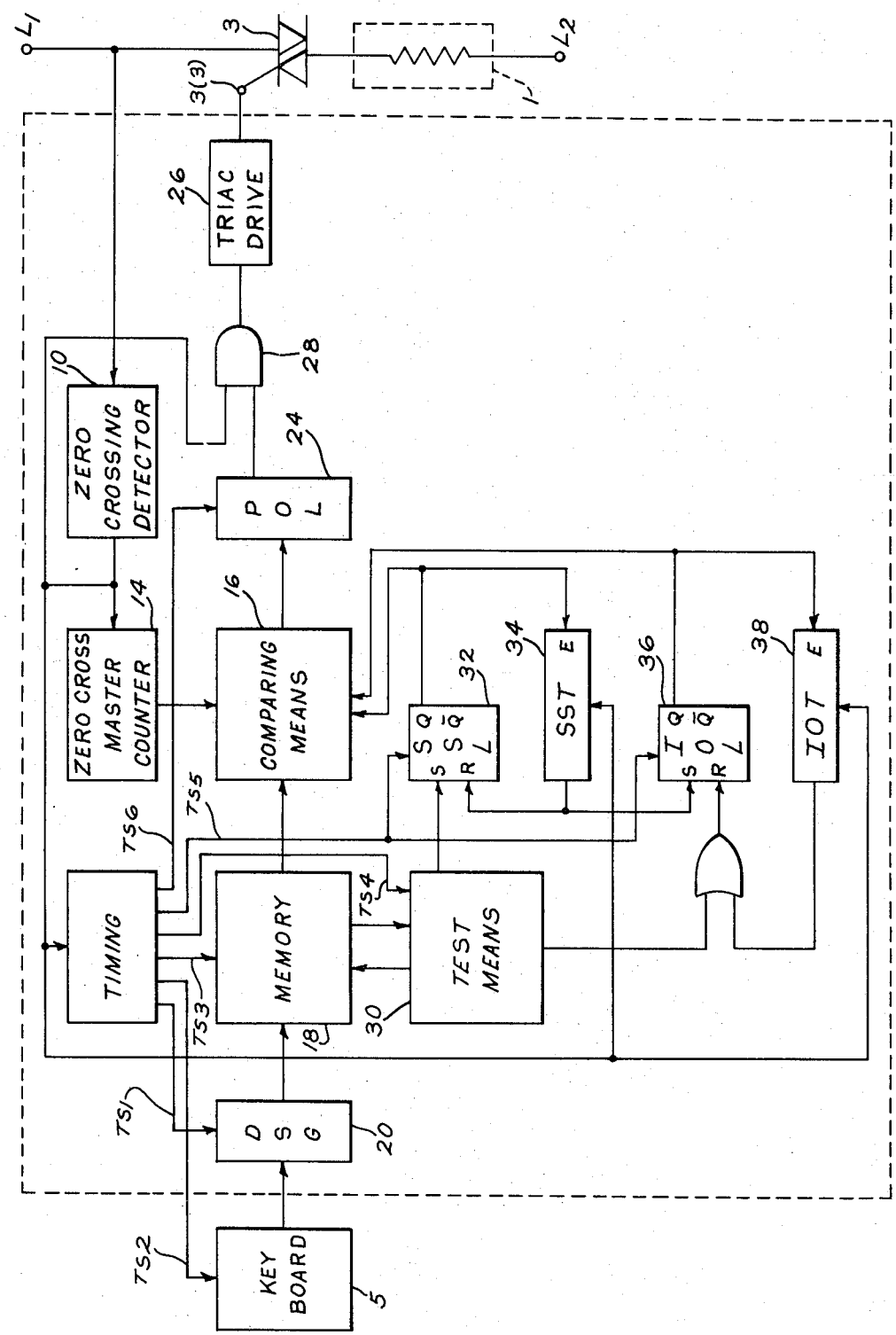
FIG. 3 is a functional block diagram of the control system of the invention.

According to the present invention, control system 4 must perform the following functions: scan the keyboard for new power setting inputs; identify and store newly-entered power setting selections; determine which of three operating modes, Steady State, Soft Start, or Instant On, is to be implemented; and generate triac trigger pulses at the appropriate rate. The functional block diagram of FIG. 3 illustrates the control system provided by the present invention to perform these functions.

Control system operation is synchronized with zero crossings of the power signal by zero crossing pulses generated by zero crossing detector 10, which monitors the power signal and generates a zero crossing pulse with each detection of a zero crossing of the power signal. These pulses are illustrated at I of FIG. 2. As shown, the control interval is the period between leading edges of the zero crossing pulses. The control logic is completely cycled through once each control interval, during which a triac triggering decision is made for implementation in the next control interval. The zero crossing pulses generated by detector 10 initiate the control intervals.

Upon the initiation of each control interval, keyboard 5 is scanned for the presence of a newly-entered power setting selection. During the scanning process, each key of keyboard 5 is individually scanned. When activation of a particular key is detected, a digital control signal corresponding to the power setting associated with that key is generated by signal generator 20 and transmitted to memory 18. Memory 18 includes a temporary storage location KB (not shown) and a permanent storage location PM (not shown) for storing control signal data. The newly-entered digital control signal from generator 20 is initially stored in temporary location KB. After test means 30 tests this signal in a manner to be described, the signal stored at KB may be transferred to permanent storage location PM in memory 18 where it is retained indefinitely until replaced by a control signal representing a subsequently selected power setting. The designations PM and KB are occasionally used in the balance of this description interchangeably to refer to the memory locations and the signals stored at these locations, as is customary in the art. In each instance the meaning will be apparent from the context.

Test means 30 monitors inputs stored at KB to determine whether the input represents a blank, i.e. no new inputs, an OFF setting, an On setting, or one of settings 1–7. When a blank is identified, the contents of permanent storage location PM are undisturbed, and control proceeds in accordance with the previously entered setting stored at PM. When a new input is identified by test means 30 as an OFF setting, the signal is read into PM replacing the previously entered setting.

When either an ON setting or one of settings 1–7 is identified however, additional testing is performed on the contents of PM before reading the contents of KB into PM, to insure that the proper selection sequence is employed and to determine whether a transient mode must be initiated or terminated. When the new setting represents one of power settings 1–7, PM is tested for an OFF signal. Since the operator is required to select the ON setting before selecting a power setting when switching from an OFF setting, a new setting representing one of settings 1–7 is ignored when PM contains an OFF signal. The additional transient mode testing is described in relation to the Soft Start and Instant On modes.

Zero crossing master counter 14 is a counter arranged to repetitively count a predetermined number of zero crossing pulses from detector 10, and reset. For reasons which will subsequently become apparent, the predetermined number of counts should equal the period of the lowest desired power pulse repetition rate. In the preferred embodiment, this rate is one power pulse per 64 control intervals, the period being 64 pulses or control intervals. Thus, counter 14 repetitively counts 64 zero crossing pulses. The instantaneous contents representing the current count of counter 14 is designated ZCM.

During Steady State operation, certain bits of the count ZCM are compared with the signal at PM by comparing means 16. The output of comparing means 16 either sets or resets Power On Latch (POL) 24 depending upon the results of the comparison. The resulting set or reset state of POL 24 represents the decision to apply a power pulse or not apply a power pulse, respectively. This decision is given effect upon the occurrence of the next zero crossing pulse via logical AND gate 28 which ANDs the output of POL 24 with the output of zero crossing detector 10. The output of AND gate 28 is coupled to gate terminal 3(3) of triac 3 via a conventional triac driver network 26. The state of POL 24 determines whether a trigger pulse is gated through AND gate 28 to the triac driver network. When POL is set, the occurrence of a zero crossing pulse in effect gates a trigger pulse through gate 28 to the input of triac driver network 26 where it is applied to the triac gate, thereby triggering the triac into conduction. The nature of triac 3 is such that once triggered it remains conductive, without the presence of a gate trigger, until the polarity of its main terminals reverses. Thus, once a trigger pulse is applied at the beginning of the control interval, the triac remains conductive for the balance of that interval. When POL is not set, no pulse is gated through gate 28 when the next zero crossing pulse is generated. Thus, no trigger pulse is applied to the triac gate and triac 3 is non-conductive during that control interval. In this fashion, the decision to apply a power pulse or not apply a power pulse to the heating element is made during one control interval and implemented at the beginning of the next control interval.

For controlling conventional heating elements to provide a desired range of cooking temperatures, selection of an appropriate range of power pulse repetition rates is accomplished according to the linear relationship between Power On time and output power. However, for heating elements made of $MoSi_2$, tungsten or similar materials, a range of repetition rates is required which compensates appropriately for the non-linear relationship between Power On time and heating element output power which is characteristic of heating elements of this type. The non-linear relationship is a consequence of the rapid thermal response of such heating elements. At the lower repetition rates, the heating element tends to cool between Power On cycles. The reduction in resistance which accompanies the reduction in heating element temperature results in more current per conductive cycle being drawn by the heating element. It has been empirically determined that the repetition rates shown in TABLE I provide output powers which cover a satisfactory range of cooking temperatures, for such heating elements.

The pulse repetition rates listed in TABLE I may be expressed as $\frac{1}{2}^n$ for n ranging from 6 to 0 for power settings 1–7, respectively. For example, for power setting 1, n=6; for n=6, $\frac{1}{2}^n = \frac{1}{2}^6 = 1/64$ which is the desired repetition rate for power setting 1; similarly, for power setting, 3 n=4; for n=4, $\frac{1}{2}^n = \frac{1}{2}^4 = 1/16$ which is the desired pulse repetition rate for setting 3.

In implementing the repetition rates of TABLE I, use is made of the characteristic of binary counters that an identical state of the first n least significant bits will recur every $2^n$ counts. For example, at least the first three least significant bits of the count will be zero every $2^3$ or eight counts, at least the first four least significant bits will be zero every $2^4$ or 16 counts, and so on. Comparing means 16 implements the power pulse repetition rate by performing a logical comparison on the first n significant bits of the count ZCM of counter 14, the value for n being determined by the control signal representative of the power setting selected as shown in TABLE I.

When the first n least significant bits are all found to be in the logical zero state the comparing means provides a trigger signal, and when these bits are not all logically zero, no trigger signal is provided. For example, for power setting 4, which requires a repetition rate of $\frac{1}{3}$ or $\frac{1}{8}$, n=3, the control signal directs the comparing means to test the first 3 least significant bits, thus a trigger pulse is provided upon each recurrence of the count in which at least the first three least significant bits are logical zeros, which occurs once every 8 counts. Since counter 14 counts zero crossing pulses, the comparing means in this example provides a trigger pulse once every 8 control intervals.

Thus far, Steady State operation has been functionally described. It remains to describe the functional implementations of the Soft Start and Instant On mode.

The transient modes designated Soft Start and Instant On are initiated by test means 30. It will be recalled that these transient modes are to be implemented when the power setting is changed from OFF to some other power setting. It should be noted that the operator, when changing from an OFF setting to some other power setting, must select the ON setting and then select the desired one of power settings 1-7. Thus, the ON setting need only be selected when changing from OFF to some other setting. Use is made of this sequence in implementing the Soft Start mode.

As previously described, test means 30 monitors the new scan results temporarily stored at KB. When an ON setting is detected at KB, test means 30 tests the signal stored at PM to determine if the control signal previously entered represents an OFF setting, indicating that the setting is being changed from OFF to ON. If the signal stored at PM does not represent an OFF setting, indicating that the setting is not changing from an OFF setting, the ON input is ignored and the contents of PM are undisturbed. If PM contains a signal representing an OFF setting, the first step in implementing the Soft Start mode is accomplished by reading the ON signal stored at KB into PM. The second step occurs when a signal representing the selected one of settings 1-7 is entered at KB. Test means 30 upon detecting a signal representing one of settings 1-7 at KB tests the contents of PM for a signal representing an ON signal. When the ON signal is detected, test means 30 provides a set signal to Soft Start Latch (SSL) 32, thereby completing the initiation of the Soft Start mode. The contents of KB is then read into PM. Comparing means 16 then sets and reset POL 24 in a predetermined sequential pattern which characterizes the Soft Start mode.

In a preferred embodiment, this pattern is identical to the code for power setting 5. Consequently, during the Soft Start mode, the power pulse repetition rate is that associated with power setting 5; namely, one power pulse per four control intervals. It has been empirically determined that this power pulse repetition rate is an optimum rate which can reliably be applied to a cold $MoSi_2$ or tungsten type heating element without exceeding the current surge capability of a typical household power circuit. Use of this optimum rate enables the heating element to rapidly attain its steady state resistance value. Obviously, the rate can vary depending on the threshold limits of the power circuit overcurrent protective means and the current ratings of the electrical circuit components.

Soft Start Timer (SST) 34 is enabled by the setting of SSL 32. SST 34 controls the duration of the Soft Start operating mode by counting a predetermined number of zero crossing pulses from zero crossing detector 10. In the preferred arrangement, a Soft Start time of approximately one second is used with the above-noted repetition rate. When this predetermined count is reached, SST 34 generates an output signal and resets. This signal resets SSL 32 thereby terminating the Soft Start mode, and sets Instant On Latch (IOL) 36, thereby initiating the Instant On mode. IOL 36, when set, enables comparing means 16 to implement the maximum power setting independently of the actual power setting selected. IOL 36 also enables Instant On Timer IOT 38. IOT 38 determines the duration of the Instant On mode by counting a predetermined number of zero crossing pulses and resetting. This Instant On period has been selected in the preferred embodiment to be approximately 8½ seconds at the designated maximum rate. When IOT 38 resets, a reset signal is outputed by IOT which resets IOL 36, thereby ending the Instant On mode. The Steady State operating mode then proceeds as previously described.

It will be recalled that the Instant On mode is to be terminated in the event a change in power setting from higher to lower (or OFF) occurs while the Instant On mode of operation is in progress. Test means 30 performs this function as follows. In the event a signal representing one of settings 1-7 is detected at KB while operating in the Instant On Mode, indicating a change in power setting from one to another of settings 1-7, then a magnitude comparison is performed on the contents of KB and PM. When the magnitude of the signal at KB is less than that at PM, indicating that the new setting is lower than the previous setting, test means 30 provides a reset signal to Instant On Latch 36 thereby terminating the Instant On operating mode. The signal at KB is read into PM and Steady State operation implementing the newly-entered power setting proceeds.

To demonstrate system operation by example, it will be assumed that the last power setting entered was an OFF setting and the heating element is to be operated at power setting 6. The operator actuates first the ON button, then button 6 at keyboard 5. Actuation of the ON button causes signal generator 20 to generate a digitally coded signal representing the ON setting. This signal is stored at temporary location KB of memory 18. Test means 30 responds to this entry in memory 18 by testing PM for a signal representing an OFF setting. As the previous entry was an OFF setting, the ON signal is transferred into PM. Actuation of button 6 causes signal generator 20 to transmit a signal representing power level 6 to memory location KB. Test means 30 upon detecting the presence of a signal representing one of power settings 1-7 at location KB and an ON signal at PM proceeds to set Soft Start Latch 34. Comparing means 16 responds by implementing power setting 5 of TABLE I to provide the desired Soft Start power pulse repetition rate of ¼. Comparing means 16 continues to operate in this fashion for approximately one second whereupon SST 34 times out resetting SSL 34 and setting IOL 36 thereby terminating the Soft Start mode and initiating the Instant On mode. Setting of IOL 36 enables IOT 38 and causes comparing means 16 to implement power setting 7.

The power pulse rate will be 1/1 corresponding to power setting 7 for the duration of the Instant On mode. After about 8½ seconds, IOT 38 times out resetting IOL 36. The Instant On mode is thereby terminated and Steady State operation ensues. In the Steady State mode the output of comparing means 16 will implement a pulse repetition rate of ½, corresponding to power setting 6.

If, in the above example, power setting 4 was subsequently entered during the Instant On mode, test means 30 would respond to this new entry by comparing the signal at KB with that at PM. This comparison would indicate that the signal at KB is less than that at PM. Test means 30 would then transfer the signal at KB to PM and reset both IOL 36 and IOT 38 thereby terminating the Instant On mode, and the Steady State mode would begin.

Microprocessor Embodiment

Figure 4:
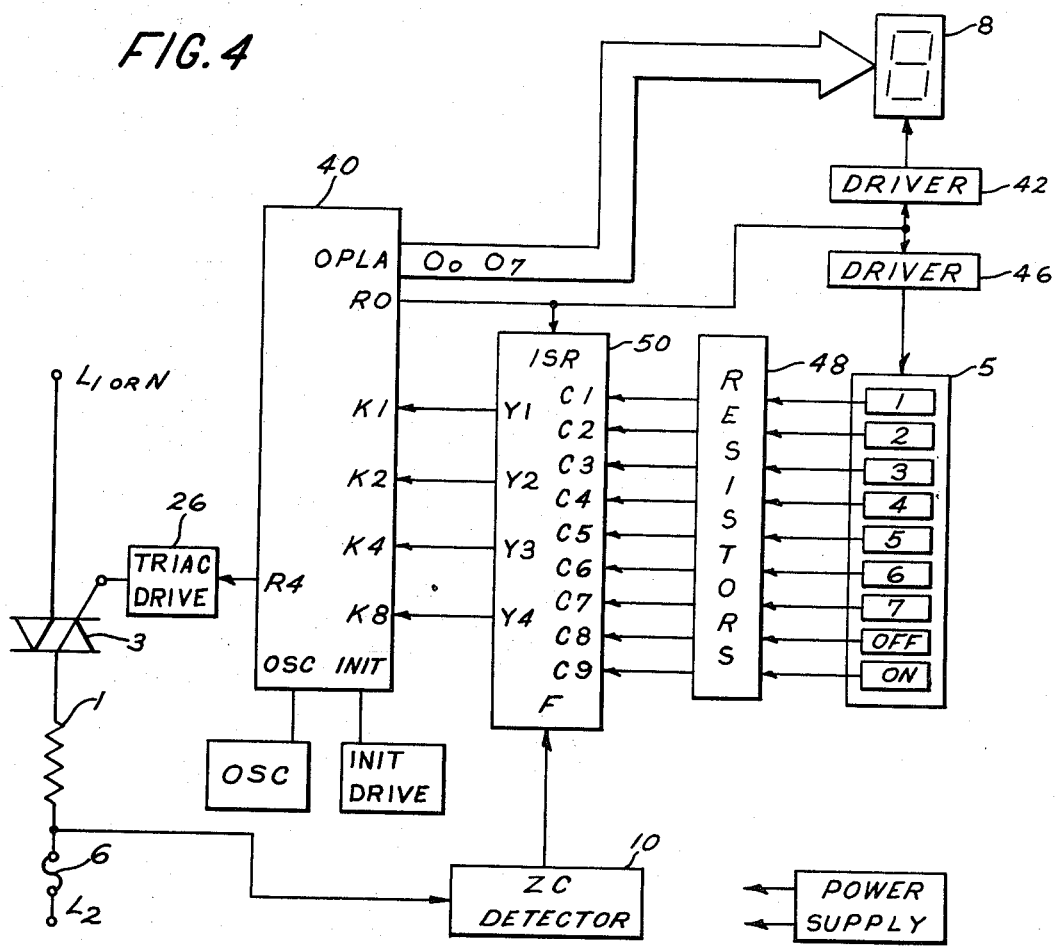
FIG. 4 is a block diagram of the microprocessor based embodiment of the invention.

FIG. 4 schematically illustrates a preferred embodiment of a control circuit for a single heating element glass ceramic hotplate employing a $MoSi_2$ heating element in which power control is provided electronically by a TMS 1000 series microprocessor or chip. The TMS 1000 series chip is commercially available from Texas Instruments, Inc., and others. Technical details of the chip are available in a Texas Instruments, Inc. publication entitled "TMS 1000 Series Data Manual," published December 1975.

Referring to FIG. 4, chip 40 is a TMS 1000 series microprocessor chip which has been customized by permanently configuring its read only memory (ROM) to implement the control scheme of the present invention.

Keyboard 5 is a capacitive touch array comprising a single column of 9 keys. The keys enable an operator to select power levels 1–7 in addition to ON and OFF. Keyboard 5 operates in the manner of conventional capacitive touch keyboards which is well known in the art and is described here only to the extent necessary to understand how the inputs to the control system are generated. Each key of keyboard 5 includes a top pad and two bottom pads (not shown). A dielectric material separates the top and bottom pads, thereby effectively forming two capacitors in series. The top pad forms a common plate, for each of the two bottom plates. The one bottom pad for each key is connected to a common input line. The other bottom pad has its own output line. Thus the keyboard has one input line commonly shared by all keys, and 9 output lines, one for each key. The keyboard is scanned by periodically applying a scan voltage to the input line. This voltage is transmitted essentially unchanged to the output lines of all untouched keys. The output of a touched key will differ, having been dampened by the added capacitance resulting from the contact of the human operator with the top pad.

In the circuit of FIG. 4, the input or scan pulse is provided by chip 40 at output RO. This pulse is periodically transmitted from RO to the input of keyboard 5 driver circuit 46. Driver circuit 46 is a conventional driver circuit used to amplify the pulse from RO. The amplified pulse is transmitted by driver circuit 46 to the input line of keyboard 5. In this manner keyboard 5 is scanned for new inputs, i.e. actuated keys, periodically, at a rate determined by the ROM of chip 40.

The output of keyboard 5 is coupled to chip 40 via a simple current limiting resistor network 48 and a capacitive interface circuit 50. Resistor network 48 merely places a large current limiting resistance on the order of 10 K ohms in series with each keyboard output line. Capacitive interface circuit 50 serves the multiple functions of prioritizing keyboard outputs, encoding the keyboard output into a digital format recognizable by chip 40, and multiplexing this input to chip 40 with the zero crossing pulses from zero crossing detector 10, thereby enabling chip 40 to synchronize its control functions with zero crossings of the AC power signal.

In this embodiment, capacitive interface 50 is a TMS 1976 series integrated circuit, which is readily commercially available from Texas Instruments, Inc. As the details of this circuit are not critical to the presently claimed invention, its operation will be explained only to the extent necessary to an understanding of the present invention. Detailed information regarding the operation of this circuit in interfacing with a capacitive touch keyboard is provided in the 1977 TI publication entitled "TMS 1976 Capacitive Touch Keyboard Interface Manual."

Interface 50 includes nine capacitive input lines, C1–C9 which are internally coupled to nine internal buffers (not shown). Each input line is biased high through a very high resistance to a high input voltage level. The internal buffers are designed to detect negative transitions from an externally generated reference voltage. Each input buffer supplies a set command to its associated internal latch (not shown) when an input voltage on its C input line is detected which is more negative than the reference voltage. The output of these latches is communicated internally to an encoder (not shown) which in turn performs the functions of prioritizing and encoding. Input line C-1 is assigned the highest priority and C-9 the lowest. The input received having the highest priority is encoded as a 4-bit BCD word and transmitted to an internal multiplexer.

The multiplexer portion of interface 50 is controlled by the input designated ISR. When ISR is low the BCD word is transferred to outputs Y1–Y4. A high level at input ISR unconditionally resets all the internal latches responsive to the C input lines and maintains this reset condition until the ISR input returns to a low level. When all latches are reset, the signal provided by the latches is the same as if no keys were pressed. In addition, when ISR is high, the F-input signal appears on output Y1. This function of the ISR line of selecting either the C input or the F input enables these inputs to be multiplexed into chip 40. Control of this multiplex function is accomplished via chip output port RO which is electrically coupled to the ISR input line of interface circuit 50.

Chip 40 receives the BCD coded 4-bit signal from interface 50, representing the scan output from keyboard 5 on input lines K1, K2, K4 and K8, which are electrically coupled to outputs Y1–Y4, respectively, of interface 50. As previously described, input K1 also couples chip 40 to zero crossing detector 10 via the F input of interface 50.

The outputs from chip 40 are transmitted from outputs Oo-O7, RO and R4. Outputs Oo-O7 provide display information to conventional 7 segment LED display 8. Line RO as previously described is coupled to input line ISR of interface 50 and the input of keyboard driver 46. In addition, line RO is coupled to the input of a conventional display driver network 42 which enables display 8. Output R4 couples chip 40 with the gate terminal of power control triac 3 via a conventional triac driver network 26 which can be any of a variety of well known driver circuits which amplifies the output from R4 and which isolates chip 40 from the power line.

It will be recalled that chip 40 is customized to perform the control functions of this invention by permanently configuring the ROM of chip 40 to implement a predetermined set of control instructions. FIGS. 5–11 are flow diagrams which illustrate the control routines implemented in the microprocessor to obtain, store and process the input data from keyboard 5 via interface 50 and generate control signals for triggering triac 3 in a manner which provides the power pulse repetition rate required for the power setting selected. From these diagrams one of ordinary skill in the programming art can prepare a set of instructions for permanent storage in the ROM of microprocessor 40.

Control Program

The control program consists of a sequence of routines illustrated in the flow diagrams of FIGS. 5–11. Each of the routines with the exception of the power up routine is cycled through once each control interval. The initial pass through the program is initiated by the application of power to the system such as by plugging the apparatus into a power supply outlet. It should be noted that the control circuit is continually energized while the apparatus is plugged in regardless of the power setting selected. Upon entering the Power Out routine, the program pauses to await the occurrence of the next zero crossing of the power signal. Upon detection of a zero crossing the triac trigger decision is communicated to the triac drive circuit by setting or resetting the output latch R4 and the program returns to the Scan Routine to begin the next cycle through the program.

A description of each routine with reference to the flow diagrams follows.

Figure 5:
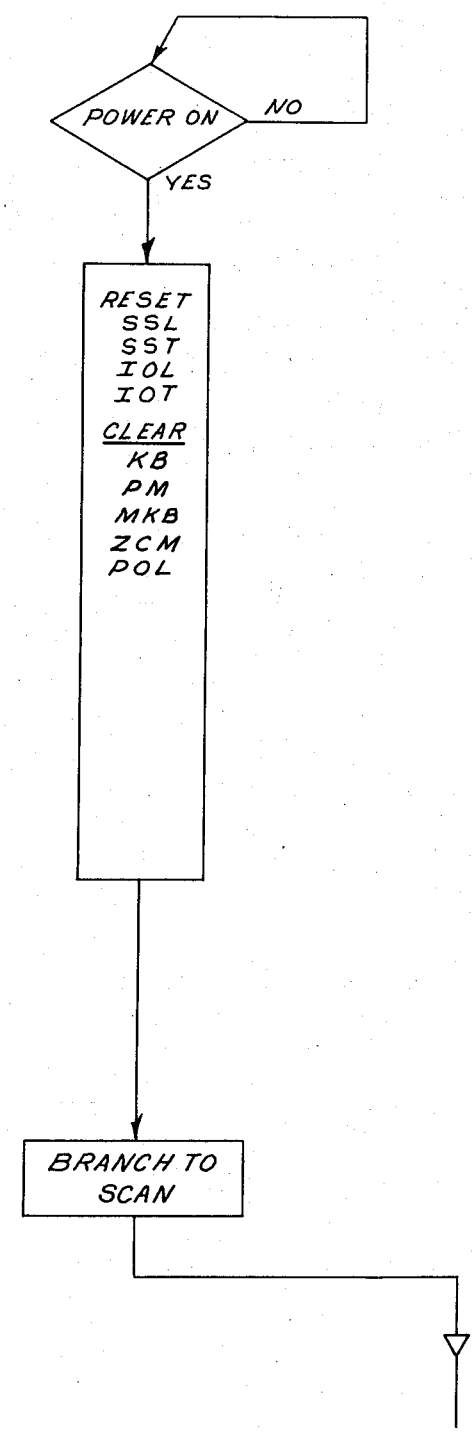
Figure 12:
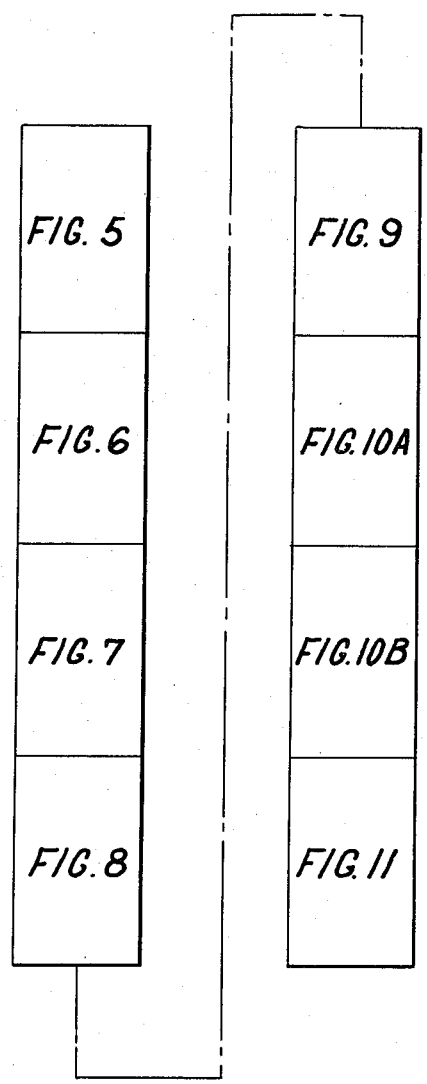
FIG. 12 shows the interrelationship between the various routines of FIGS. 5–11.

Power Up Routine—FIG. 5.

This routine resets all the internal latches and timers and clears the registers when power is initially applied, as when the cooking appliance is plugged in or when power is restored following an interruption in power service. This routine is only re-entered following an interruption in power service.

Scan Routine—FIG. 6

This routine, which is normally entered from the Power Out routine at the beginning of each control interval, controls the input of data from capacitive interface 50 and also controls the output of display data to display element 44 for displaying the power setting being implemented.

The input of data from interface 50 is accomplished by the following sequence of operations. First, the keyboard scan is reset by switching output latch RO high (Block 100). This resets the internal input buffers of interface 50. Next, the keyboard scan is set by switching output latch RO low (Block 104). This enables the transfer of the encoded C input data to the Y1-Y4 outputs of interface 50. Finally, the data on these lines are read and stored in temporary memory register KB (Blocks 106–107). Having completed the retrieval of input data from the keyboard, the program then branches to the Input Data Routine. During this routine display data representing the power setting currently stored in permanent memory PM is transferred to display outputs Oo-O7 (Block 102).

Input Data Routine—FIG. 7

This routine determines whether the newly entered data obtained by the scan routine and temporarily stored at KB represents a blank, i.e. no keyboard entry, an OFF setting, an ON setting, or one of settings 1-7.

In the event the new data represents a blank (Block 110), the permanent storage register PM which contains the control signal currently being implemented is undisturbed and the program branches to the Power Control Routine (FIG. 9).

If the new data at KB represents an OFF setting (Block 112), this data is read into PM (Block 114), the Soft Start and Instant On latches and timers are reset (Block 115), and the program branches to the Power Control Routine (FIG. 9).

In the event the new data represents an ON setting (Block 116), additional testing is performed to determine the necessity of implementing the Soft Start mode. The control signal stored at PM is tested (Block 118) to determine if the previously entered setting was an OFF setting. If so, the newly entered ON setting stored at KB is read into PM (Block 120). If not, the contents of PM are undisturbed and the program branches to the Power Control Routine (FIG. 9). This latter situation indicates that the setting has either gone from ON to ON or from one of settings 1-7 to ON, in which case the new ON setting is ignored.

If the new data represents neither a blank, an OFF, or an ON, as indicated by a No response at Block 116, it must represent one of settings 1-7 in which case it is necessary to test the signals stored at PM to determine if the previously entered setting was an OFF setting (Block 117). If Yes, the contents of PM are undisturbed and the program branches to the Power Control Routine (FIG. 9). This situation indicates an attempt to go from OFF to one of power settings 1-7 without first selecting an ON setting. In such instances the new power setting is ignored. A No answer at Block 117 indicates that the previous setting was either ON or one of settings 1-7, in which case the program branches to the Input Compare Routine (FIG. 8).

Input Compare Routine—FIG. 8

This routine is only entered when the new input represents one of power settings 1-7. The primary function of this routine is to initiate the Soft Start mode and terminate the Instant On mode when appropriate. This function is accomplished in the following manner. Block 122 tests PM for an On setting. When PM contains an ON setting, indicating that the power setting has been changed from ON to one of power settings 1-7, Soft Start Latch SSL is set (Block 124). The newly-entered power setting temporarily stored at KB is then transferred into PM (Block 125) and the program branches to the Power Control Routine.

If PM is found to contain a setting other than an ON setting, indicating a change from one to another of power settings 1-7, it is necessary to determine whether the newly entered setting is lower than the setting currently being implemented. It will be recalled that one feature of the control scheme of this invention is that the Instant On mode is immediately terminated if a new power setting less than the old setting is entered while operating in the Instant On mode. As indicated in TABLE I, the power settings 1–7 are represented by BCD code representative of the decimal setting designation. Thus, a magnitude comparison is performed on the signals stored at PM and KB (Block 126). If the coded signal at KB is less than that at PM, then the new setting is lower and the Instant On Latch and Instant On Timer are reset (Blocks 128 and 129). If the signal stored at KB is not less than that at PM, the Instant On Latch and Timer are unchanged. In either event, the newly-entered signal initially stored at KB is then read into PM (Block 125). The program then branches to the Power Control Routine (FIG. 9).

Power Control Routine—FIG. 9

The main functions of the Power Control Routine are to increment the master counter each control interval and implement the Soft Start and Instant On routines where appropriate. After incrementing the master counter (Block 150, which functions as a ring counter, repetitively counting 0–63, the Soft Start latch is tested (Block 152). If the latch is set, indicating operation in the Soft Start mode, the Soft Start Timer is incremented (Block 154) and the contents of the timer are tested against a reference constant designated Time Out for the purpose of limiting the duration of the Soft Start mode (Block 156). Time Out is set at 120 for a duration of approximately one second. When the contents of the timer exceed this value, the Soft Start latch and timer are reset and the Instant On Latch is set (Blocks 157–159). Block 155 exchanges the contents of MKB, a register used in implementing the Instant On Mode explained hereinafter and PM to compensate for Block 147 of the Power Compare Routine (FIg. 10B) which is entered when IOL is set. The program then branches to Block 141 of the Power Control Routine to implement the Soft Start repetition rate independently of the actual power setting stored at PM.

When the Soft Start Latch is not set, the Instant On Latch (IOL) is tested (Block 160). When this latch is set, indicative of operation in the Instant On mode, a register designated MKB is set equal to the highest power setting code, which in this embodiment is the BCD code for setting 7 (Block 161). The Instant On Timer is then incremented one count, and tested to determine whether the count has exceeded a predetermined maximum (Blocks 162, 163). If it has not, the contents of MKB and PM are exchanged (Block 164), causing PM to contain the signal corresponding to power level 7 rather than the actual power setting, thereby implementing the power pulse repetition rate associated with the Instant On mode independently of the actual power setting. When the Instant On Timer exceeds a maximum count (MAXTIME), the Instant On mode is terminated by resetting the Instant On Latch and Timer (Blocks 165 and 166). MAXTIME is set at 1020 for a duration of approximately 8½ seconds. In either event, the program then branches to the Power Compare Routine.

Figure 10A:
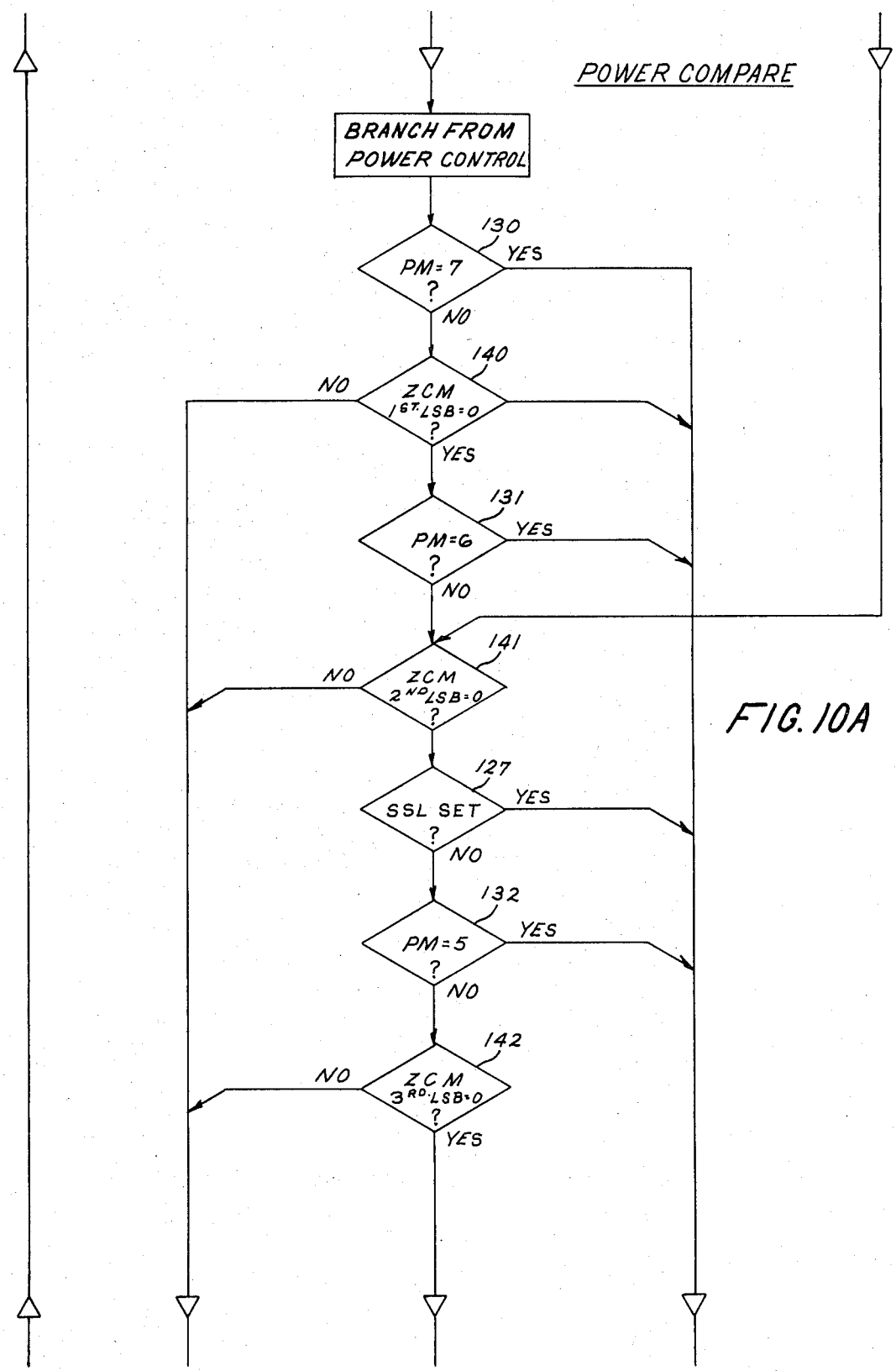
Figure 10B:
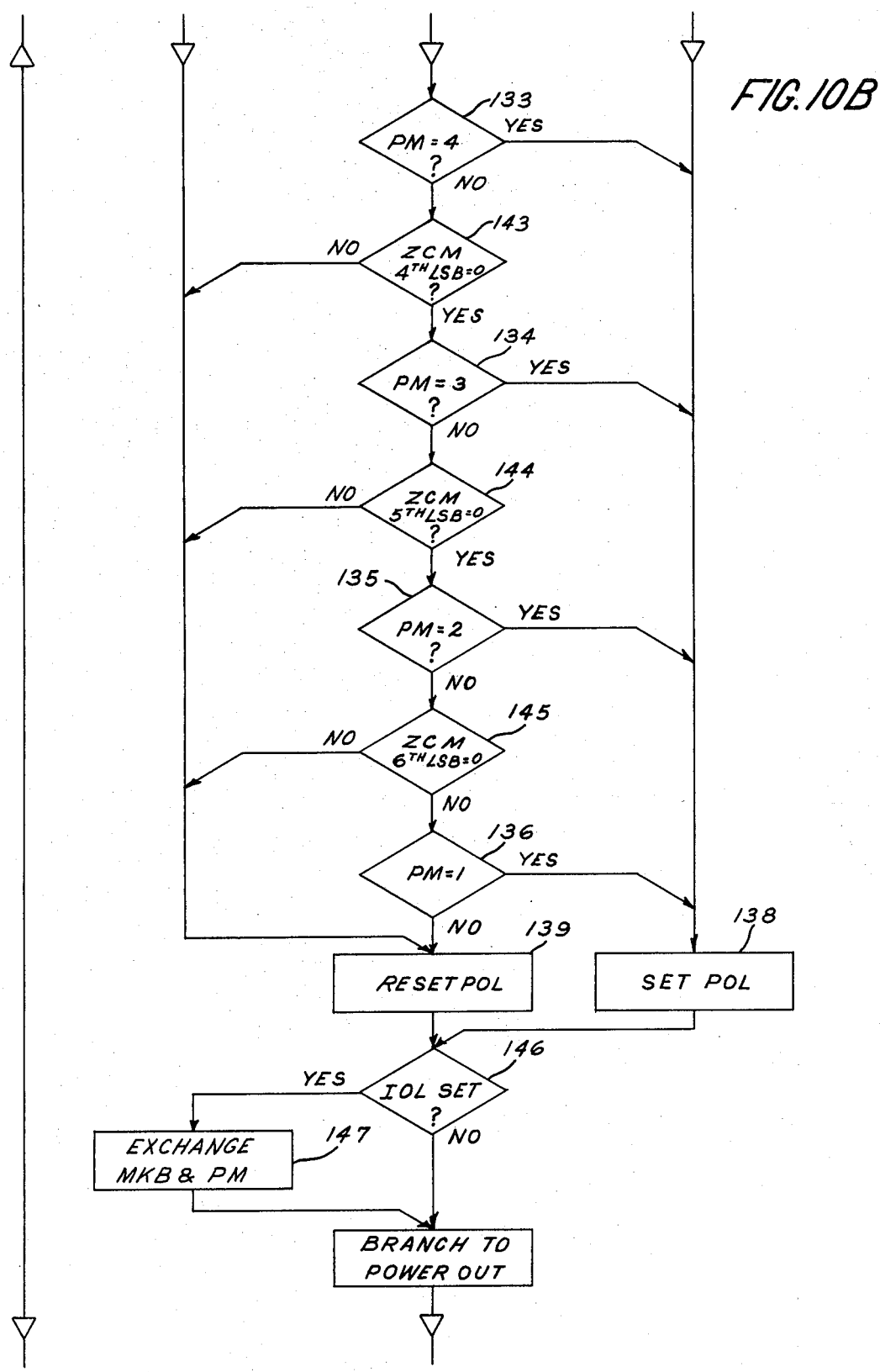

Power Compare Routine—FIGS. 10A and 10B

This routine performs the comparison of PM and ZCM to determine whether output latch R4 (FIG. 4) is to be set, resulting in triggering triac 3 into conduction, or reset, resulting in triac 3 going OFF the next pass through zero crossover, in order to properly implement the required pulse repetition rate. The compare function described hereinbefore is implemented in this embodiment as follows: PM is first tested for PM=7, indicating power setting 7 has been selected (Block 130). If YES, the Power On Latch (POL) is set (Block 138, FIG. 10B), and no further comparisons are necessary since the triac is to be triggered every control interval. If NO, then the first least significant bit (LSB) of ZCM is tested for a zero (Block 140). If not zero, then no further comparisons are necessary and POL is reset (Block 139, FIG. 10B). If this bit is zero, then PM is tested for a six (Block 131) representing the selection of power setting 6. If PM=6, then POL is set. The first least significant bit is zero every other count; thus, Block 140 is entered at every other count. Consequently, when power level 6 is selected, a decision to trigger is made every other count providing the desired ½ power pulse repetition rate. If PM is not equal to 6, then the second least significant bit of ZCM is testes for a zero (Block 141). Since this decision block is only reached when the first least significant bit has already been found to be zero, the results in effect determine whether or not the first and second least significant bits are both zero. Thus, a YES output from this block, indicating both bits are zero, will occur once every 4 counts. If the answer is YES and either power level 5 has been selected (Block 132) or the Soft Start latch SSL is set (Block 127), indicating operation in the Soft Start mode, POL is set, thereby providing the desired ¼ power pulse rate. It should be noted that when the Soft Start Latch is set, the program branches directly from the Power Control Routine to Block 141, thereby passing Blocks 130 and 131. If both bits are zero but neither the SSL is set nor the power level 5 is selected, then the third least significant bit of ZCM is tested for zero, followed, if a zero is found, by a test for PM=4 (Block 133). If a zero is not found in the third least significant bit, then a test for PM=4 is not made. This pattern continues until a match is found to exist between the appropriate number of least significant bits of ZCM found to be zero and the power setting, found in PM, resulting in a trigger decision, i.e. the setting of POL, on internal latch, or if no match is found, a NO trigger decision, i.e. the resetting of POL. The state of POL is used in the Power Out Routine in a manner to be described.

After completing the comparison tests and setting or resetting POL, the Instant On latch is tested (Block 146). If this latch is set, it is necessary to re-exchange the contents of MKB and PM (Block 147) to restore PM to its original value prior to the exchange employed to implement the Instant On mode in the Power Control Routine, which corresponds to the actual power setting selected.

The program then branches to the Power Out Routine.

Figure 11:
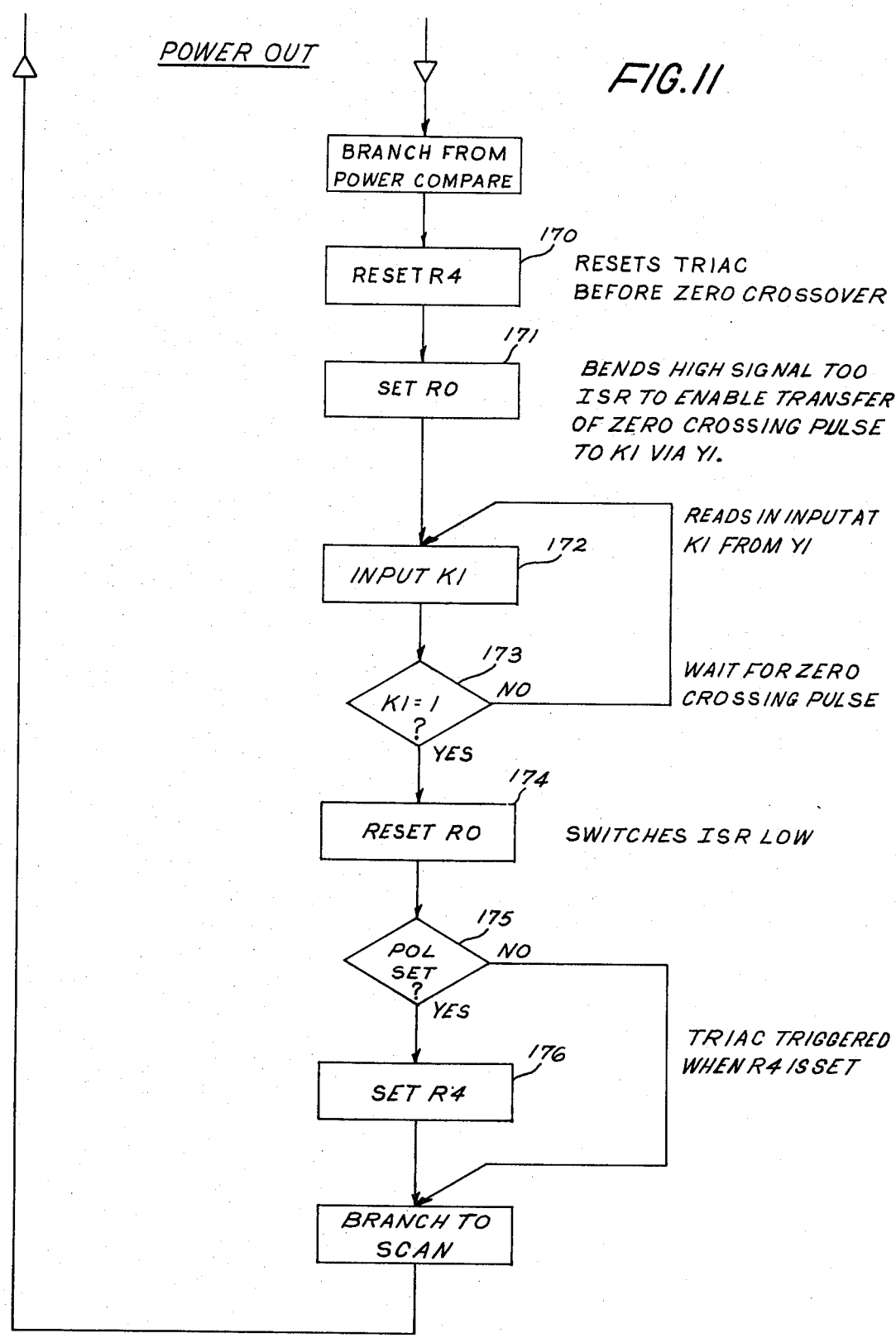

Power Out Routine—FIG. 11

The function of this routine is to synchronize triac triggering with power signal zero crossings. Upon entering this routine the output latch R4 (FIG. 4), which is coupled to the triac gate terminal, is reset (Block 170). Latch RO is set high (Block 171), thereby providing a high level signal to the ISR input of interface 50 (FIG. 4) to multiplex the F input from zero crossing detector 10 to input K1 of chip 40. The control program now tests input K1, waiting for a high or one input to be received signifying the receipt of a zero crossing pulse from detector 10 (Blocks 172 and 173). Upon receipt of the zero crossing pulse, RO is switched low, resetting ISR (Block 174), and POL is tested (Block 175). If POL is set, then output latch R4 is set (Block 176) which causes a trigger voltage to be applied to the triac gate terminal via drive circuit 26 (FIG. 4). If POL is not set then R4 remains in its reset state and triac 3 is not switched into conduction. The program then branches back to the Scan Routine to repeat the cycle.

Alternate Embodiment

Because of cost consideration, a microprocessor is the primary control element in the control circuit of a preferred embodiment of the present invention. However, the inventive concept is not intended to be limited to such an embodiment. The control scheme of this invention as illustrated by the functional block diagram of FIG. 3 and the flow diagrams of FIGS. 5-11 can be implemented using hard wired digital logic circuitry, employing circuit components which are readily commercially available.

FIGS. 13-16 and 18 illustrate the logic circuitry for an alternate embodiment of the present invention using hard wired digital logic circuitry in lieu of a microprocessor. Elements corresponding functionally to those previously described retain the same numerical designations. The logic circuits illustrated are interfaced in a manner shown generally by the block diagram of FIG. 3.

As in the previously described embodiment the control interval is the period between leading edges of successive zero crossing pulses. The logic circuitry is cycled through once during each control interval. Timing signals for clocking latches and registers are provided by conventional means for synchronizing circuit operation within the control interval. Details of the timing circuitry are not shown, since the particular circuitry is not an essential element of the invention as claimed, and such circuits are conventional and well known in the art.

In the logic circuit to be described, the interface circuitry is omitted for purposes of clarity, such circuitry again being conventional and well known in the art.

Timing

In the microprocessor embodiment, the timing of logical events is inherently accomplished as a consequence of the serial nature of the microprocessor. Each instruction is performed in sequence, with only one instruction being capable of execution at any one time. Thus, when the control interval is initiated by the input to the chip of a zero crossing pulse, the microprocessor steps through the instructions stored in the ROM. Proper ordering of the execution of the instructions in the ROM solves the timing problem.

Figure 17:
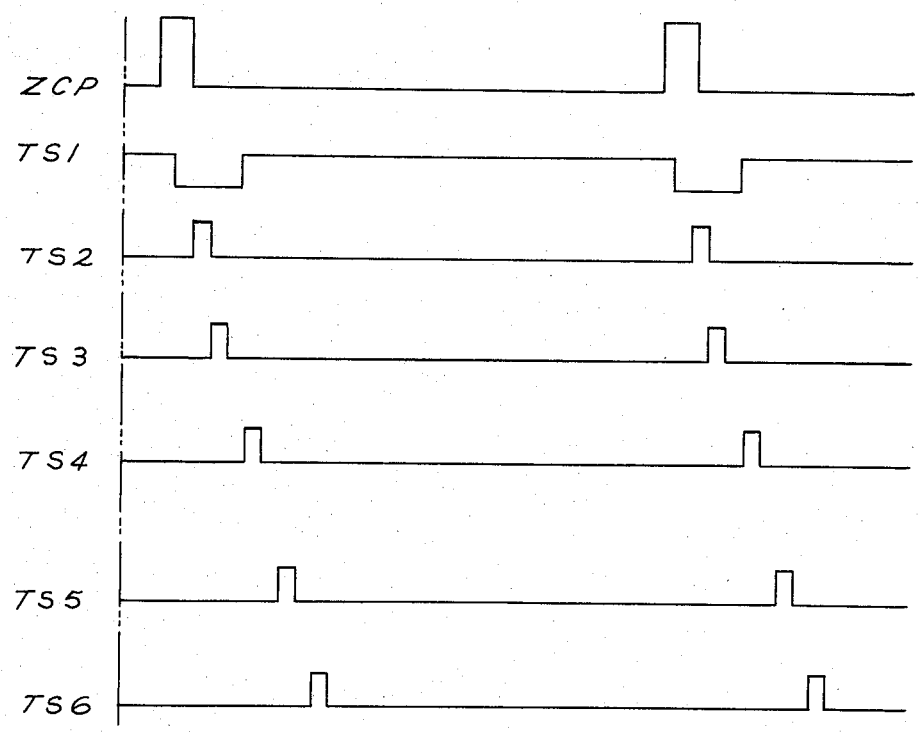
FIG. 17 is a timing diagram illustrating the various timing signals used in the digital logic embodiment of the invention.

In the digital logic circuit embodiment, the timing of events within each control interval can be controlled using a timing circuit which provides six timing signals of the type illustrated in the timing diagram of FIG. 17. Conventional counter oscillator circuitry capable of producing timing signals in accordance with the timing diagram of FIG. 17 are well known in the art. As the details of such a circuit are not part of the present invention as claimed, the timing circuit will be described only in terms of its output.

Figure 13:
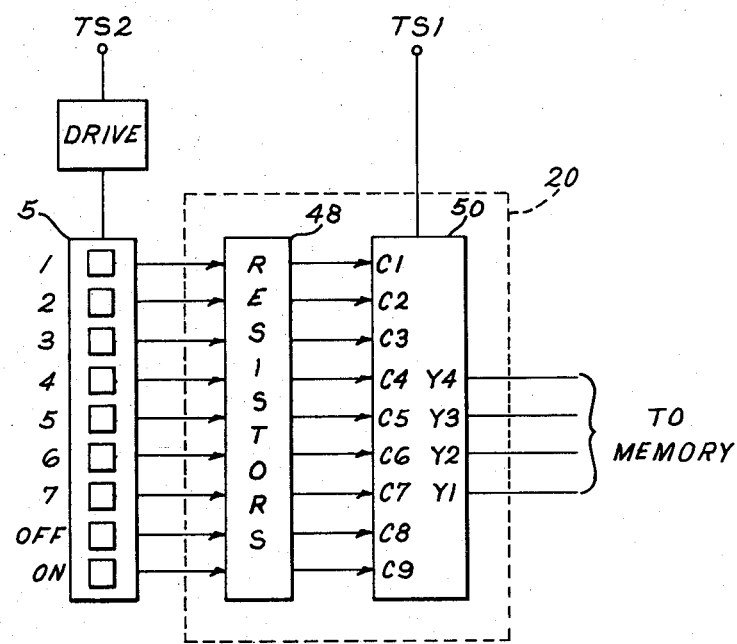
FIG. 13 is a block diagram showing in greater detail the keyboard and digital signal generator elements of FIG. 3 for the digital logic embodiment of the invention.
Figure 14:
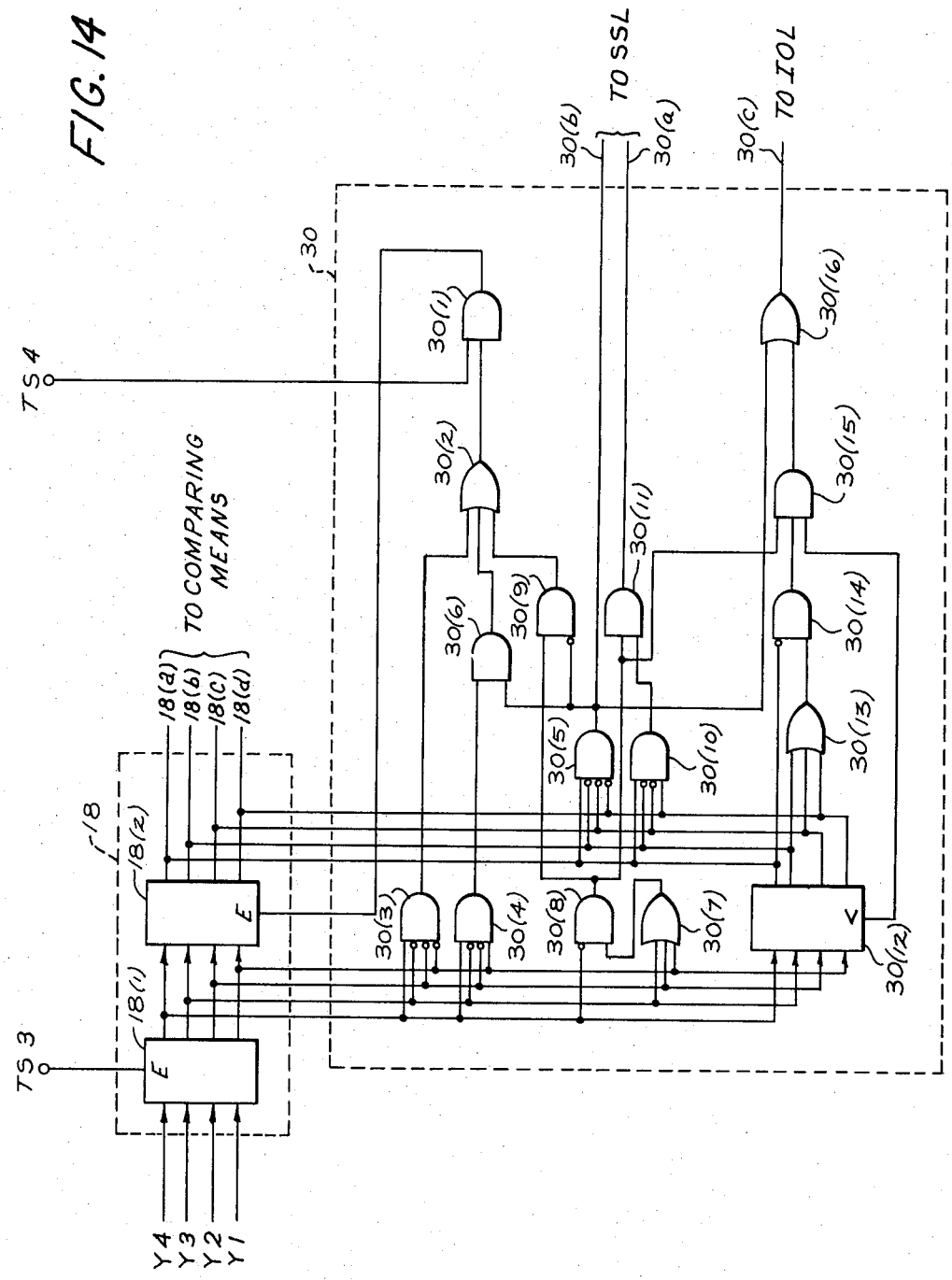
FIG. 14 is a logic diagram showing in greater detail the memory means and test means of FIG. 3 for the digital logic embodiment of the invention.

Referring now to FIG. 17, curve ZCP represents the output of zero crossing detector 10. The pulse repetition rate of this signal is 120 pulses per second. Signals TS1-TS6 are employed to synchronize logic circuit operation within each control interval. TS1 is a negative going pulse which is applied to the ISR input of capacitive interface 50 (FIG. 13). The negative going pulse must be of sufficient duration to remain low long enough to allow the keyboard to be scanned by TS2 which is applied to the keyboard input (FIG. 13) and the results of this scan read into storage register 18(1) of memory 18 which is enabled by TS3 which is applied to the enable input of register 18(1)(FIG. 14). That is, TS1 must overlap TS2 and TS3. TS4 serves as an enable signal for register 18(2) of memory 18. This signal is gated to the enable input of register 18(2) via AND gate 30(2) of test means 30 (FIG. 13). Timing signal TS 5 is applied to the clock inputs of Soft Start Latch 32 and Instant On Latch 36 (FIG. 18A) to update the outputs of these latches in response to the new scan results. Comparing means 16 then updates its output in accordance with the updated latch information. Timing signal TS6 applies a pulse to the clock input of Power On Latch 24 (POL)(FIG. 18B) to enable the output of the latch to reflect the updated output from the comparing means. Once POL is clocked, the circuit waits for the next zero crossing pulse which initiates the next control interval. The output of POL 24 is gated to the gate terminal of triac 3 by the zero crossing pulse (FIG. 3).

Digital Signal Generator

FIG. 13 illustrates the circuit employed to implement the functions of digital signal generator 20 of FIG. 3. It will be recalled that the function of signal generator 20 is to provide a 4-bit digital signal representative of the power setting selected by operator actuation of a key of keyboard 5. This is accomplished in the circuit of FIG. 3 using the same basic circuit elements previously described with reference to the microprocessor embodiment, namely, capacitive touch keyboard 5, resistor network 48 and capacitive interface 50. The difference being essentially that the interface 50 performs the encoding and prioritizing functions as previously described, but does not multiplex zero crossing pulse data with the control signal data as in the previous embodiment. The timing circuitry (not shown) is arranged to provide a scanning signal TS2 (FIG. 17) for the keyboard and the appropriate signal TS1 (FIG. 17) to the ISR input to allow the keyboard to be scanned once each control interval. As with the previous embodiment, Table I shows the relationship between power setting and the coded digital signal provided by capacitive interface 50.

Memory

FIG. 14 illustrates the logic circuitry for implementing the memory 18, and test means 30 of FIG. 3. In this embodiment, memory 18 includes a temporary memory element 18(1) designated KB and a permanent memory 18(2) designated PM. It should be noted that KB is updated every control interval to store the results of each keyboard scan. PM is only updated when an actuated key is detected. Each of these elements essentially comprises a 4-bit parallel-in/parallel-out storage register of the type readily available as an integrated circuit by the serial number SN 74194.

Register 18(1) receives and stores the control signal from signal generator 20. This signal is read into register 18(1) by timing signal TS3 of the timing diagram of FIG. 17. The output of register 18(1) is tested by test means 30 in a manner to be described below. An output from test means 30 enables register 18(2), when appropriate, by sending a pulse to the enable input (E) of register 18(2) thereby enabling the reading of the coded signal in register 18(1) into 18(2). The contents of register 18(1) is unchanged by this occurrence.

Test Means

Test means 30 enables the new signal temporarily stored in register 18(1) to be read into register 18(2) only when (1) the new signal stored is an OFF signal; or (2) the new signal is an ON signal and the old signal stored at register 18(2) is an OFF signal; or (3) the new signal is one of power settings 1-7 and the old signal is not an OFF signal. In addition, test means 30 resets the Soft Start and Instant On Latches when an OFF signal is stored in register 18(2). By virtue of condition (1), an OFF signal is always read into 18(2); condition (2) insures that the ON setting is selected prior to one of power settings 1-7 when changing from an OFF condition and also that an ON setting is ignored if the old signal is one of power settings 1-7; and (3) allows changes from one to another of power settings 1-7. It should be noted that a blank input, representing a condition in which no actuated key is detected, is inherently excluded by allowing the enabling of register 18(2) only under conditions (1), (2), or (3), as just described.

Test means 30 of this embodiment will be described with reference to the logic diagram of FIG. 14. The output of logical AND gate 30(1) is coupled to the enable input of register 18(2). When the output of gate 30(2) is a logical one, the signal at register 18(1) is read into register 18(2). Gate 30(1) serves to synchronize the enabling of register 18(2) with timing signal TS4 (FIG. 17) by ANDing the TS4 signal with the output of logical OR gate 30(2), which is a logical one when any one of conditions (1), (2), or (3) is satisfied. The presence of an OFF signal (1000) at register 18(1) is detected by logical AND gate 30(3) which has as inputs the four outputs at register 18(1). The inputs to gate 30(3) corresponding to the three least significant bits of the signal at register 18(1) are inverted. Thus, the output of gate 30(3) is a logical one when an OFF signal represented by the signal (1000) is stored at register 18(1). The output of gate 30(3) is coupled to the enable input of register 18(2) via gates 30(2) and 30(1).

The presence of an ON signal at register 18(1) is detected by logical AND gate 30(4), which has as inputs the outputs of register 18(1). The inputs to gate 30(4) corresponding to the second and third least significant bits of the signal at register 18(1) are inverted. Thus, the output of gate 30(4) is a logical one when an ON signal (1001) is stored at register 18(1). The output of gate 30(4) is coupled to the enable input of register 18(2) via gates 30(6), 30(2) and 30(1). An OFF signal at register 18(2) is detected by logical AND gate 30(5) which has as inputs the four outputs of register 18(2). The inputs to gate 30(5) corresponding to the three least significant bits of register 18(2) are inverted. Thus, the output of gate 30(5) is a logical one when an OFF signal (1000) is stored at register 18(2). Logical AND gate 30(6) ANDs the outputs of gates 30(4) and 30(5). Thus, the outputs of gate 30(6) is a logical one when the new signal at register 18(1) is an ON signal and the old signal at register 18(2) is an OFF signal. The output of gate 30(6) is coupled to the enable input at register 18(2) via gates 30(2) and 30(1).

The presence of a signal representing one of power settings 1-7 at register 18(1) is detected by gates 30(7) and 30(8). Logical OR gate 30(7) has as inputs the outputs at register 18(1) corresponding to the three least significant bits. Consequently, the output at gate 30(7) is a logical one for a signal representing any non-blank signal at register 18(1). Logical AND gate 30(8) ANDS the output of gate 30(7) with an inverted input corresponding to the most significant bit of register 18(1). As shown in TABLE I, the most significant bit is a logical one for settings ON and OFF and a logical zero for power settings 1-7. Thus, the output of gate 30(8) is a logical one when the signal at register 18(1) represents any one of power settings 1-7 and a logical zero otherwise. Logical AND gate 30(9) ANDs the output of gate 30(8) with the inverted output of gate 30(5). Consequently, the output of gate 30(9) is a logical one when the output of gate 30(8) is a logical one and gate 30(5) is a logical zero, indicating that the signal at register 18(1) corresponds to one of settings 1-7 and the signal at register 18(2) is not an OFF setting. The output of gate 30(9) is coupled to the enable input of register 18(2) via gates 30(2) and 30(1).

Test means 30 sets Soft Start Latch 32 (FIG. 18A) when (a) register 18(1) contains a signal representing one of power settings 1-7; and (b) register 18(2) stores an ON signal. Condition (a) is identified by a logical one at the output of logical AND gate 30(8) as previously described.

Condition (b) is detected by AND gate 30(10) which has as inputs the output lines from register 18(2), the lines representing the second and third least significant bits being inverted, so that the output of gate 30(10) is a logical one only when the signal stored in register 18(2) is an ON signal (1001). The outputs of gates 30(8) and 30(10) are ANDed by logical AND gate 30(11). The output of 30(11), designated 30(a), is coupled to the set input of Soft Start Latch 32 (FIG. 18A). A logical one is thus applied to set SSL when conditions (a) and (b) above are satisfied.

Test means 30 resets Instant On Latch 36 (FIG. 18A) when the signal at register 18(1) represents a lower power setting than that represented by the signal in register 18(2). This is accomplished by comparator 30(12) which performs a magnitude comparison of the contents of the two registers.

In the circuit of FIG. 14 this function is performed by comparator 30(12) and gates 30(5), 30(8), and 30(13)-30(15). A comparison of the contents of the registers 18(1) and 18(2) is continuously performed by comparator 30(12), which is a conventional 4-bit magnitude comparator of the type readily available as an integrated circuit identified by the serial number SN 7485. When the magnitude of the contents of register 18(1) is less than the contents of register 18(2), such as occurs when the newly entered power setting is a lower setting than the previously entered setting, the output of comparator 30(12) is a logical one. This output is coupled to AND gate 30(15) which ANDs this output with the outputs of AND gates 30(8) and 30(14). As just described, the output of AND gate 30(8) is a logical one when the contents of register 18(1) represents any one of power settings 1-7. The output of logical AND gate 30(14) which ANDs the inverted most significant bit of register 18(2) with the output of logical OR gate 30(13) which ORs the three least significant bits of register 18(2), similarly is a logical one when register 18(2) contains a code representing any one of power settings 1-7.

Thus, gate 30(15) gates the results of the comparison to the reset input of Instant On Latch 36 (FIG. 3) via logical OR gate 30(16) whenever registers 18(1) and 18(2) both contain codes representing any one of power settings 1-7. When the above condition is satisfied and the power setting represented in register 18(1) is lower than that in register 18(2), the output of gate 30(15), and consequently the output of gate 30(16), designated 30(c), is a logical one which results in the resetting of Instant On Latch 36.

The output of gate 30(5) is also coupled to the reset input of Instant On Latch 36 via OR gate 30(16). Consequently, latch 36 is similarly reset when an OFF setting (1000) is stored in register 18(2).

Finally, the output of gate 30(5), designated 30(b), is coupled directly to the reset input of Soft Start Latch 32. Consequently, Soft Start Latch 32 is reset when an OFF signal is stored in register 18(2).

Zero Crossing Master Counter

Figure 15:
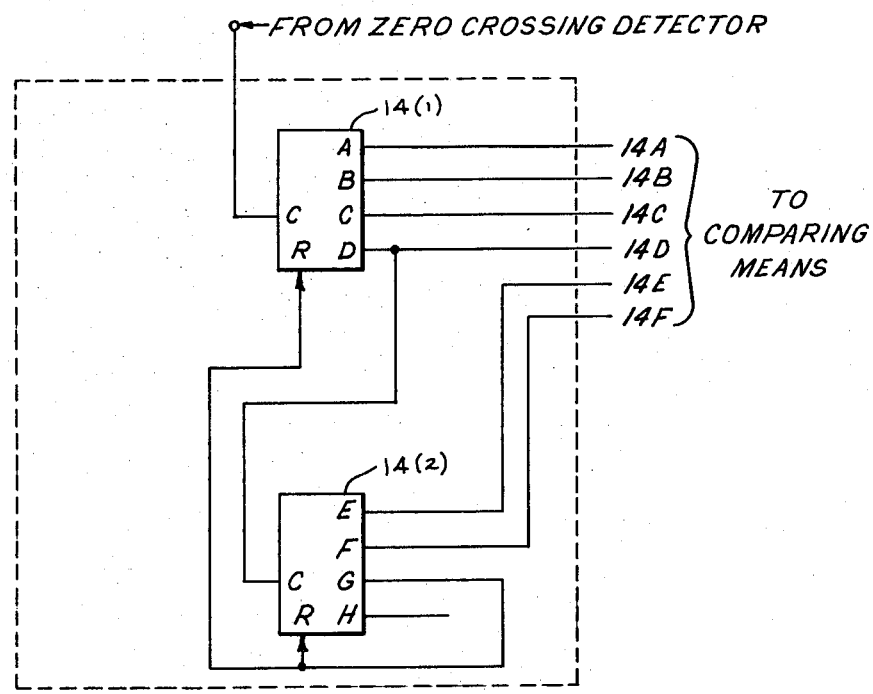
FIG. 15 is a block diagram showing in greater detail the zero crossing master counter for the digital logic embodiment of the invention.

The master counter 14 of FIG. 3 is implemented in this embodiment by an 8-bit ring counter which counts zero crossing pulses provided by zero crossing detector circuit 10 (FIG. 3). The 8-bit counter 14 is formed by cascading two four-bit ripple through counters as shown in FIG. 15. Outputs (A)-(D) of counter 14(1) provide the 1st-4th least significant bits of the count respectively, with outputs (E)-(F) of counter 14(2) providing the 5th and 6th least significant bits, respectively. The output of zero crossing detector 10 is coupled to the clock input of counter 14(1). Comparing means 16, to be described, receives outputs 14A-14F representing the first 6th least significant bits of the count respectively. Counters 14(1) and 14(2) are of the type readily available as integrated circuits identified by the serial number SN 7493.

Comparing Means

Figure 16:
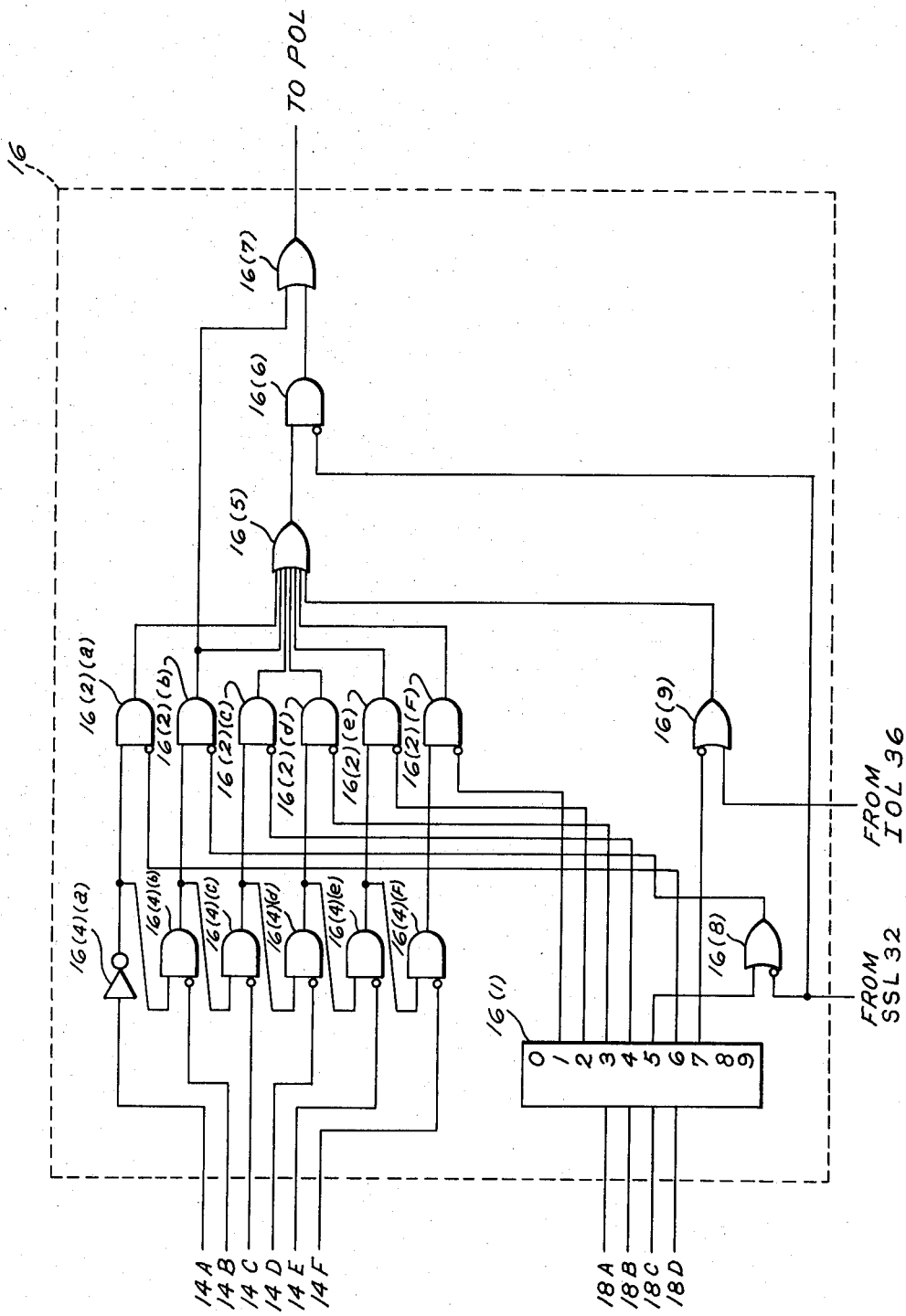
FIG. 16 is a logic diagram showing in greater detail the comparing means of the digital logic embodiment of the invention.

Comparing means 16 in this embodiment, as illustrated in FIG. 16, essentially comprises a network of logic gates 16(4)(a)-16(4)(f), designated counting gates, responsive to the first 6 least significant bits of the output from counter 14; a conventional 4-line to 10-line BCD to decimal decoder 16(1) responsive to the output from register 18(2) of memory 18; and a network of logic gates 16(2)(a)-16(2)(f), designated comparing gates, responsive to the outputs from the counting gates and the decoder. The outputs of the comparing gates are coupled to the Power On Latch 24 (FIG. 3) via logic gates 16(5)-16(7). Logic gates 16(8) and 16(9) couple the inputs from the Soft Start and Instant On latches 34 and 36 (FIG. 3), respectively, to the comparing means circuitry in a manner to be described.

Before describing the circuit of FIG. 16 in greater detail, it may be helpful to review the function of comparing means 16 in the control system of FIG. 3, and the manner in which this function is performed. The function of comparing means 16 of FIG. 3 is to determine during the present control interval whether or not power control triac 3 (FIGS. 1,3) will be switched into conduction for the next control interval. Referring briefly to FIG. 3, it can be seen that the output of comparing means 16 is coupled to the gate terminal of triac 3 via Power On latch (POL) 24, AND gate 28 and triac driver circuit 26. In the present embodiment when the output of comparing means 16 is a logical one, POL 24 is set (when set, the output of POL is a logical one). Upon the occurrence of the next zero crossing of the power signal, a zero crossing pulse is generated by detector 10, which is ANDed with the output of POL 24 by AND gate 28, causing the output of gate 28 to be a logical one. When this logical one output of gate 28 is amplified and applied to the gate terminal of triac 3 via triac driver circuit 26, triac 3 is switched into conduction. When the output of comparing means 16 is a logical zero, POL 24 is reset (output is a logical zero) and the output of gate 28 is a logical zero. Thus, no gating signal is applied to the gate terminal of triac 3 and the triac becomes non-conductive at the occurrence of the next zero crossover on the power line. Consequently, the rate at which the output of comparing means 16 switches to a logical one determines the power pulse repetition rate.

In this embodiment, as in the previous embodiment, comparing means 16 enables a repetition rate of $\frac{1}{2}^n$ to be implemented by triggering the triac whenever the first n least significant bits of master counter 14 are all logical zeros. For example, power setting 4 requires a pulse repetition rate of $\frac{1}{8}$ or $\frac{1}{2}^n$ where n=3. The desired repetition rate of $\frac{1}{8}$ is achieved by triggering the triac whenever the first 3 least significant bits of the counter are logical zeros, which occurs once every 8 counts.

In the circuit of FIG. 16, decoder 16(1) identifies the power setting to be implemented; the counting gates 16(4)(a)-16(4)(f) indicate how many least significant bits are zero for each count of counter 14; and comparing gates 16(2)(a)-16(2)(f) determine whether the combination of power setting and least significant bit information for that particular count requires that triac 3 (FIG. 3) be switched into conduction.

Decoder 16(1) identifies the power setting to be implemented by decoding the output from register 18(2) of memory 18 (FIG. 13). It will be recalled that register 18(2) stores a BCD signal representing the power setting being implemented. Decoder 16(1) has one output line uniquely associated with each power level setting. Lines 1-7 correspond to power settings 1-7, respectively. (Lines 0, 8 and 9 are not used in this embodiment.) The power setting represented by the coded input to decoder 16(1) is identified by a logical zero on the associated decoder output line. All other output lines are logical ones. For example, when the coded input represents power setting 3, the output decoder on line 3 is a logical zero and the output on the other lines are all logical ones. Thus, the output line of decoder 16(1) which is logical zero identifies the power setting stored in register 18(2). Decoder 16(1) is a conventional 4 to 10 line BCD to decimal decoder of the type readily available commercially as an integrated circuit identified by the serial number SN 7442.

The count from zero cross master counter 14 is processed by counting gates 16(4)(a)-16(4)(f) in the following manner. The input on lines 14(a)-(f) from counter 14 represent the first-sixth least significant bits of the count respectively. Gate 16(4)(a) is a logical inverter the output of which is a logical one when the first least significant bit is zero. The output of gate 16(4)(a) is ANDed with the inverted input from line 14B by logical AND gate 16(4)(b) such that the output of gate 16(4)(b) is a logical one only when the first two least significant bits are zero. Similarly, the output of gate 16(4)(b) is ANDed with the inverted input on line 14(c) by logical AND gate 16(4)(c) thereby causing the output of gate 16(4)(c) to be a logical one only when the first three least significant bits are zero. This pattern is repeated for gates 16(4)(d)-16(4)(f).

Comparing gates 16(2)(a)–16(2)(f), respectively, are utilized to AND the individual outputs from counting gates 16(4)(a)–16(4)(f) with the inverted outputs 6-1 from decoder 16(1), respectively; that is, logical AND gate 16(2)(a) ANDs the output of gate 16(4)(a) with inverted decoder output line 6; gate 16(2)(b) ANDs outputs from gate 16(4)(b) and decoder line 5; and so on. Each of the comparing gates can be viewed as uniquely associated with that particular power setting represented by its input from decoder 16(1). At most, only one of the outputs of comparing gates 16(2)(a)–16(2)(f) can be a logical one during any control interval, and its output will be a logical one only when the least significant bit pattern associated with the power setting with which the comparing gate is associated occurs. For example, when power setting 3 is is to be implemented, decoder outputs 3 from 16(1) is a logical zero, and the remaining decoder outputs are logical ones. Thus, the inverted decoder input to gate 16(2)(d) is a logical one and the inverted inputs to the remaining comparing gates are logical zeros. Thus the outputs of the comparing gates other than 16(2)(d) will remain logical zero regardless of the count. The output of gate 16(2)(d), however, will be a logical one only when the first four least significant bits from counter 14 are zero, as indicated by a logical one at the output of gate 16(4)(d). Thus, for power setting 3, the output of gate 16(2)(d) will be a logical one once every sixteen counts.

Logical OR gate 16(5) ORs the outputs of comparing gates 16(2)(a)–16(2)(f), and, accordingly, the output of gate 16(5) will be a logical one whenever the output of any of the comparing gates is a logical one. It should be noted here that, thus far, the description of this circuit has been limited to implementing power settings 1–6. Power setting 7 is associated with a pulse repetition rate of 1/1. Thus, the output of comparing means 16 must be a logical one every count for power setting 7 when operating in the Steady State mode. This is accomplished in the present embodiment by coupling decoder output 7 to gate 16(5) via OR gate 16(9). The output of gate 16(9) will be a logical one whenever a logical zero appears at its inverted input. Consequently, the output of gate 16(5) will be a logical one whenever power setting 7 is being implemented.

It remains to describe the manner in which comparing means 16 implements the Soft Start and Instant On modes. Considering first the Soft Start mode, it will be recalled that when the Soft Start Latch is set, a predetermined power pulse repetition rate is to be implemented independently of the power setting selected. In this embodiment, as in the microprocessor controlled embodiment, a power pulse repetition rate of ¼ corresponding to power setting 5 is to be implemented when implementing the Soft Start mode.

The input to comparing means 16 from Soft Start latch 32, designated 32(a), (FIG. 18A), is a logical one when the latch is set and a logical zero when that latch is reset. Consequently, the output of logical OR gate 16(8) which ORs the inverted output of latch 32 with output 5 of decoder 16(1), is a logical zero when either the Soft Start Latch is set or when power setting 5 is selected. Thus, the output of comparing gate 16(2)(b) associated with power setting 5 is a logical one when the first two least significant bits are zero and either the Soft Start Latch is set or the power setting 5 is being implemented.

In order to override the actual power setting during the Soft Start mode, logical AND gate 16(6) ANDs the output of gate 16(5) and the inverted input from the Soft Start Latch. Thus, when the Soft Start Latch is set, the output of 16(6) is a logical zero regardless of the output of gate 16(5). Consequently, an alternate path for coupling the output of compare gate 16(2)(b) to the output of the comparing means is provided via OR gate 16(7).

It will be recalled that when operating in the Instant On mode, a power pulse repetition rate of 1/1 corresponding to power setting 7 is implemented regardless of the actual power setting selected. This is accomplished in the present embodiment as follows. The input from Instant On Latch 36, designated 36(a) (FIG. 18A), is a logical one when that latch is set and a logical zero when that latch is reset. The input from the Instant On Latch is ORed with the inverted output of decoder line 7 corresponding to power setting 7. Thus, the output of gate 16(9), and consequently the output of gate 16(5), is a logical one whenever either the Instant On Latch is set or power setting 7 is being implemented.

Latches and Timers

As previously described, in the initiation, duration and termination of the Soft Start and Instant On modes, use is made of latches and timers. In addition, Power On Latch 24 is used to store the output of comparing means 16 and in coupling this output to the gate terminal of triac 3 (FIG. 3).

FIG. 18A illustrates that portion of the control circuit which includes Soft Start Latch 32, Soft Timer 34, Instant On Latch 36 and Instant On Timer 38 for the present embodiment. Latches 32 and 36 are conventional J-K flip-flops of the type readily available commercially as integrated circuits identified by serial number SN 7470.

As illustrated in FIGS. 14, 16 and 18A, the J input of latch 32 is coupled to the output of gate 30(8) of test means 30, designated 30(a). The Q output of latch 32 is coupled to the input of gate 16(8) of comparing means 16, via line 32(a). The Q output is also coupled to timer 34.

In operation when test means 30 determines that implementation of the Soft Start mode is required, a logical one appears at the output of gate 30(8) of test means 30 (FIG. 13). The Q output of latch 32 then switches to a logical one when clocked by timing signal TS5 (FIG. 17) and remains a logical one until a logical one signal is clocked through via the K input of latch 32. When reset, the output of latch 32 switches to a logical zero and remains zero until the Soft Start mode is subsequently required.

Timer 34 controls the duration of the Soft Start operating mode by counting a predetermined number of zero crossing pulses when enabled by the set state of the latch and resetting both itself and the Soft Start Latch. In this embodiment a duration of approximately one second is required. This is achieved by cascading two 4-bit counters 34(1) and 34(2) to act as an 8-bit counter and using output 34(3) corresponding to the most significant bit of the count to reset latch 32 and counters 34(1) and 34(2). On the 128th count, a logical one will appear on line 34(3) causing counters 34(1) and 34(2) and latch 32 to reset upon the occurrence of the TS5 timing signal via AND gates 32(1) and 34(5). The frequency of the zero crossing pulses is 120 Hz. Thus, a count of 128 pulses satisfactorily approximates the desired one-second duration.

The counting of zero crossing pulses by counters 34(1) and 34(2) of timer 34 is enabled by the output of latch 32 which is ANDed with the output of zero crossing detector 10 (FIG. 3) via logical AND gate 34(4). Consequently, the zero crossing pulses are gated through gate 34(4) to the clock input of counter 34(1) when latch 32 is set and blocked when latch 32 is reset.

Latch 32 and counters 34(1) and 34(2) of timer 34 are reset upon the occurrence of either of the following events: the counting of a predetermined number of counts; or the entry of an OFF signal in register 18(2) (FIG. 14). Logical OR gate 32(1) couples output 30(b) from test means 30 and output 34(3) representing the most significant bit of counter 34(2) to the K input of latch 32. Consequently, a logical one at either output 30(b) indicating entry of an OFF setting or 34(3) indicating the occurrence of the 129th count will result in a logical one at the output of gate 32(1), thereby resetting latch 32.

A logical one at the output of gate 32(1) also resets the counter in synchronism with timing signal TS5 (FIG. 17). The output of gate 32(1) is coupled to the reset inputs of counters 34(1) and 34(2) via logical AND gate 34(5) which ANDs the output of gate 32(1) with timing signal TS5. A logical one output at gate 34(5) resets counters 34(1) and 34(2).

Operation of the Instant On Latch 36 (IOL) and Instant On Timer (IOT) 38 are similar to that of the Soft Start Latch and Soft Start Timer just described. Latch 36 is set by a logical one at output 34(3) of counter 34(2). Setting of latch 36 enables timer 38 by gating zero crossing pulses to the input of the timer via AND gate 38(1). A predetermined number of zero crossing pulses are counted by 4-bit counters 38(2)-38(4) cascaded to act as a 12-bit counter. In this embodiment the desired duration of the Instant On Mode of $8\frac{1}{2}$ seconds is approximated by a count of 1024 zero crossing pulses. Every 1024 counts the second most significant bit of the 12-bit counter switches to a logical one. The output corresponding to this bit, designated 38(5), is coupled to the K input of flip-flop 36 via OR gate 36(1). Thus, upon the occurrence of the 1024th count, the Instant On Latch is reset. Gate 38(1) then blocks any further pulses from the timer input until the IOL is again set. Latch 36 is also reset by a logical one at output 30(c) of test means 30 (FIG. 14) indicating the selection of a lower power setting, which is coupled to the K input of latch 36 via OR gate 36(1). Resetting of counters 38(2)-38(4) of timer 38 is accomplished by coupling the output of gate 36(1) to the reset inputs of each of these counters via logical AND gate 38(6). Gate 38(6) synchronizes the resetting of the counters with timing signal TS5 by ANDing the signal from gate 36(1) with timing signal TS5.

The counters 34(1) and 34(2), and 38(2)-38(4) employed in timers 34 and 38, respectively, are identical to counters 14(1) and 14(2) described with reference to Master counter 14 illustrated in FIG. 14.

Figure 18B:
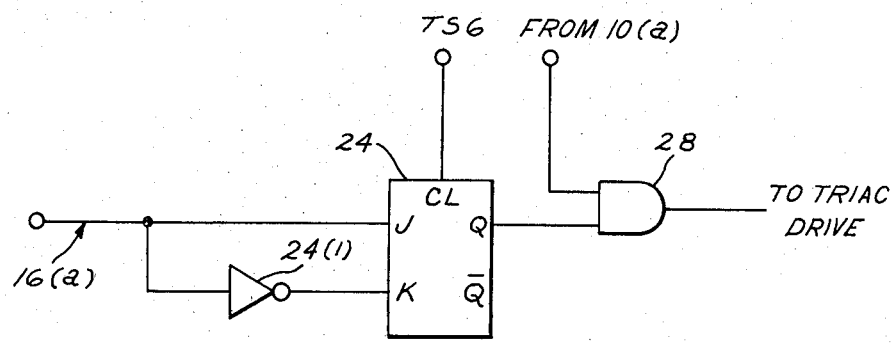

FIG. 18B illustrates Power On Latch 24 (POL) in greater detail. The latch itself is a J-K flip-flop identical to that described with reference to the Soft Start and Instant On Latches. The output of gate 16(7) of comparing means 16 designated 16(a) (FIG. 16) is directly coupled to the J input of POL 24, and coupled to the K input via logic inverter 24(1). Timing signal TS6 (FIG. 17) is applied to the clock input.

In operation, when a logical one signal from comparing means 16 sets latch 24, a logical one appears at the Q output of the latch providing a logical one at one input to gate 28. This logical one is gated through to the triac driver circuit upon the next occurrence of a zero crossing pulse applied to the other input of AND gate 28, thereby triggering triac 3 into conduction in synchronism with the zero crossing of the power signal. When the output of comparing means 16 is a logical zero, a logical zero appears at the J input and a logical one appears at the K input of latch 24, resetting the latch (switching the Q output to a logical zero). Consequently, a logical zero appears at one input to AND gate 28 and no signal is gated through to the triac driver circuit upon the occurrence of the next zero crossing pulse. Triac 3 thus remains non-conductive during the next control interval.

The illustrative embodiments herein described have employed a control interval of one-half cycle duration. However, it will be apparent to one skilled in the art that a full cycle control interval could be similarly employed. In that instance the power pulses applied would be one full cycle of the power signal rather than a half cycle. The advantage of employing the half-cycle control interval is that a useful range of cooking temperatures can be provided with maximum OFF time between power pulses being 63 half-cycles. To provide roughly the same range of cooking temperatures using a full cycle control interval, OFF times between power cycles are twice that of the half-cycle case at each power setting except for the 100% setting. Consequently, stress on circuit components resulting from current surges is somewhat greater using a full cycle control interval. In addition, during operation in the Soft Start Mode using half power cycles, the stress on circuit components is less since the duration of the power pulse being applied to the cool heating element is half what it would be in the full cycle approach.

The disadvantage of the half-cycle approach for the repetition rates provided in the embodiments herein disclosed is that the power pulses, with the exception of the maximum power setting, are at the same polarity, resulting in a d.c. component of current being drawn from the power source. Clearly, this d.c. component is eliminated when a full cycle control interval is employed.

Other modifications and alterations of this invention will become apparent to those skilled in the art from the foregoing discussion, and it should be understood that this invention is not limited to the specific embodiments described. It is intended to cover by the following claims all modifications coming within the spirit and scope thereof.

What is claimed is:

1. A heating apparatus comprising a heating element, power control means having a plurality of operator selectable power level settings including an OFF setting for controlling the power output of said element, said element characterized by a relatively fast thermal response whereby application of power thereto at a predetermined level results in an almost immediate visible glow from said element, and means for applying power to said element at said predetermined level for a preselected time prior to energizing said element at an operator selected power level.

2. The combination recited in claim 1 wherein said last named means responds to the transition from an OFF setting to one of said power level settings.

3. In an apparatus including a heating element and power control means for applying power to said element at different levels corresponding to the selection of one of a plurality of manually operable power level settings, said settings including an OFF setting, the improvement wherein said power control means responds to the transition from an OFF setting to another selected power setting to activate said element at a power level sufficient to produce a visible glow therefrom for a preselected time prior to activating the element at a power level corresponding to said selected power setting.

4. The combination recited in claim 1 or 3 wherein said heating element comprises tungsten.

5. The combination recited in claim 1 or 3 wherein said heating element comprises molybdenum disilicide.

6. A cooking appliance including a heating element, said element giving off a visible glow almost instantaneously when operated at a first predetermined power level, power control means including a plurality of operator selectable power settings including an OFF setting, means for applying power to said element at different power levels in response to selection of said settings, and transient means for detecting the transition from said OFF setting to one of said other settings and for applying, in response to said transition, power to said element at said first predetermined power level for a first preselected time.

7. The combination recited in claim 6 wherein said transient means further includes means for operating said element at a second predetermined power level different from the level associated with said one selected setting for a second preselected time prior to operating the element at said first predetermined level, in response to said transition from OFF to a selected power setting.

8. The combination recited in claim 7 wherein said first power level is higher than said second power level.

9. The combination recited in claim 6 or 7 further including means responsive to the selection of another setting during said first predetermined time to terminate operation at said first predetermined power level.

10. The combination recited in claim 9 wherein said first selected setting corresponds to a higher power output from said element than said second setting.

11. The combination recited in claim 6 wherein said element comprises tungsten.

12. The combination recited in claim 6 wherein said element comprises molybdenum disilicide.

13. A power control system for controlling power to a resistive heating element in response to a selection by an operator of one of a plurality of power level settings comprising:
　first transient means for applying power to said element at a first power level lower than that associated with the selected power level setting for a first preselected time,
　second transient means operative in response to the passage of said first preselected time for applying power to said element at a second power level higher than said first power level for a second predetermined time, and
　steady state means operative in response to the passage of said second preselected time to control power to said element in accordance with said selected power level.

14. The combination recited in claim 13 wherein said first and second transient means includes means for varying the rate at which a power pulse of constant duration is applied to said element.

15. The combination recited in claim 14 wherein said power pulse comprises a single pulsation of an AC power source coupled across said element.

16. The combination recited in claim 13 wherein said first transient means includes rate control means for applying a power pulse to said element at a first repetition rate, and said second transient means comprises rate control means for applying said power pulse to said element at a second repetition rate higher than said first rate.

17. The combination recited in claim 16 wherein said second predetermined time is longer than said first predetermined time.

18. The method of informing the operator of an electric heating appliance that the appliance has been turned ON comprising the steps of detecting the transition of said appliance from an OFF condition to a first selected power level, and operating the heating element of said appliance for a first preselected time in response to said transition at a first predetermined power level different from said first selected power level to produce a visible glow.

19. The method of claim 18 further including the step of operating said appliance after expiration of said first preselected time at said first selected power level.

20. The method recited in claim 19 further including the step of operating said element at a second predetermined power level lower than said first predetermined power level for a second preselected time prior to operating at said first predetermined level.

21. The method recited in claim 19 or 20 further including the sequential steps of terminating operation of said element at said first predetermined power level prior to the expiration of said first preselected time in response to detection of a operator selected transition to a second selected power level, and operating said element at said second selected power level.

22. A power control system for controlling power to a heating element in response to selection by an operator of one of a plurality of power settings comprising:
　power control means for applying different levels of power to said element in response to selection of different ones of said settings, and
　transient control means responsive to selection of at least one of said settings for successively applying two distinct levels of power to said element for preselected times before applying power at the level associated with said selected one setting.

23. The combination recited in claim 22 wherein said transient control means includes means for varying the rate of power pulses applied to said element.

24. The combination recited in claim 22 wherein said element is characterized by a resistance at room temperatures which draws excessive current from household power supply, the resistance of said element increasing rapidly as a function of increasing heating element temperature.

25. The combination recited in claim 13, 22 or 24 wherein said heating element comprises tungsten.

26. The combination recited in claim 13, 22 or 24 wherein said heating element comprises molybdenum disilicide.

27. The combination recited in claim 14 or 23 wherein said power pulse comprises a full wave of said AC source.

* * * * *